(12) United States Patent
Moshfeghi

(10) Patent No.: US 10,735,079 B2
(45) Date of Patent: Aug. 4, 2020

(54) METHOD AND SYSTEM FOR DISTRIBUTED TRANSCEIVERS AND MOBILE DEVICE CONNECTIVITY

(71) Applicant: Golba LLC

(72) Inventor: Mehran Moshfeghi, Rancho Palos Verdes, CA (US)

(73) Assignee: Golba LLC, Rancho Palos Verdes, CA (US)

(*) Notice: Subject to any disclaimer, the term of this patent is extended or adjusted under 35 U.S.C. 154(b) by 0 days.

(21) Appl. No.: 16/231,903

(22) Filed: Dec. 24, 2018

(65) Prior Publication Data

US 2019/0222292 A1 Jul. 18, 2019

Related U.S. Application Data

(63) Continuation of application No. 16/016,619, filed on Jun. 24, 2018, now abandoned, which is a (Continued)

(51) Int. Cl.
*H04B 7/06* (2006.01)
*H04W 4/00* (2018.01)
(Continued)

(52) U.S. Cl.
CPC ............ *H04B 7/0697* (2013.01); *H04B 7/02* (2013.01); *H04B 7/024* (2013.01); *H04B 7/0456* (2013.01);
(Continued)

(58) Field of Classification Search
CPC .... H04B 17/26; H04B 17/309; H04B 17/336; H04B 17/382; H04B 7/02; H04B 7/024;
(Continued)

(56) References Cited

U.S. PATENT DOCUMENTS 3,618,097 A 11/1971 Mcleod, Jr.
5,473,602 A 12/1995 McKenna et al.
(Continued)

FOREIGN PATENT DOCUMENTS

EP 1890441 A2 2/2008
EP 1890441 A3 3/2013
(Continued)

OTHER PUBLICATIONS

Non-Final Office Action for U.S. Appl. No. 16/016,619 dated Sep. 25, 2018.
(Continued)

*Primary Examiner* — Tan H Trinh
(74) *Attorney, Agent, or Firm* — Chip Law Group

(57) ABSTRACT

A plurality of distributed transceivers in a mobile entity such as a car, a truck, an omnibus (bus), a trailer, a mobile home, train, bus, a forklift, construction equipment, a boat, a ship, and/or an aircraft, and/or one or more corresponding antenna arrays that are communicatively coupled to the distributed transceivers are configured to handle communication of one or more data streams among one or more of a plurality of wireless communication networks, one or more other mobile entities and/or one or more mobile communication devices. The data streams may be communicated utilizing the configured one or more of the plurality of distributed transceivers and/or the one or more corresponding antenna arrays. The wireless communication networks includes a satellite network, a wireless wide area network, a wireless medium area network, a wireless local area network, a wireless personal area network, a network cloud and/or the Internet.

20 Claims, 6 Drawing Sheets

Related U.S. Application Data continuation of application No. 13/919,932, filed on Jun. 17, 2013, now Pat. No. 10,020,861.

(60) Provisional application No. 61/725,005, filed on Nov. 11, 2012, provisional application No. 61/680,872, filed on Aug. 8, 2012.

(51) Int. Cl.

| | |
|---|---|
| *H04L 12/64* | (2006.01) |
| *H04B 17/26* | (2015.01) |
| *H04B 17/309* | (2015.01) |
| *H04B 17/382* | (2015.01) |
| *H04B 7/08* | (2006.01) |
| *H04B 7/10* | (2017.01) |
| *H04B 7/12* | (2006.01) |
| *H04W 84/00* | (2009.01) |
| *H04B 7/02* | (2018.01) |
| *H04B 7/024* | (2017.01) |
| *H04B 17/336* | (2015.01) |
| *H04L 7/033* | (2006.01) |
| *H04W 76/15* | (2018.01) |
| *H04B 7/0456* | (2017.01) |
| *H04L 5/00* | (2006.01) |
| *H04W 24/02* | (2009.01) |
| *H04W 16/10* | (2009.01) |

(52) U.S. Cl.
CPC ......... *H04B 7/0617* (2013.01); *H04B 7/0689* (2013.01); *H04B 7/0871* (2013.01); *H04B 7/10* (2013.01); *H04B 7/12* (2013.01); *H04B 17/26* (2015.01); *H04B 17/309* (2015.01); *H04B 17/336* (2015.01); *H04B 17/382* (2015.01); *H04L 5/0048* (2013.01); *H04L 7/033* (2013.01); *H04L 12/6418* (2013.01); *H04W 4/00* (2013.01); *H04W 24/02* (2013.01); *H04W 76/15* (2018.02); *H04W 84/00* (2013.01); *H04W 16/10* (2013.01)

(58) Field of Classification Search
CPC .. H04B 7/0456; H04B 7/0617; H04B 7/0689; H04B 7/0697; H04B 7/0871; H04B 7/10; H04B 7/12; H04L 12/6418; H04L 5/0048; H04L 7/033; H04W 16/10; H04W 24/02; H04W 4/00; H04W 76/15; H04W 84/00
USPC ...... 455/7, 15, 41.2, 101, 509, 575.1, 456.1, 455/435.1, 456.6; 370/278, 295, 315, 328
See application file for complete search history.

(56) References Cited

U.S. PATENT DOCUMENTS

| | | | |
|---|---|---|---|
| 5,525,990 A | 6/1996 | Lewis | |
| 5,561,850 A | 10/1996 | Makitalo et al. | |
| 5,598,173 A | 1/1997 | Forti et al. | |
| 5,666,124 A | 9/1997 | Chethik et al. | |
| 5,771,017 A * | 6/1998 | Dean | H01Q 1/246 342/374 |
| 5,905,473 A | 5/1999 | Taenzer | |
| 5,936,577 A | 8/1999 | Shoki et al. | |
| 5,940,033 A | 8/1999 | Locher et al. | |
| 6,018,316 A | 1/2000 | Rudish et al. | |
| 6,307,502 B1 | 10/2001 | Marti-Canales et al. | |
| 6,405,018 B1 | 6/2002 | Reudink et al. | |
| 6,433,920 B1 | 8/2002 | Welch et al. | |
| 6,456,252 B1 | 9/2002 | Goyette | |
| 6,487,417 B1 | 11/2002 | Rossoni et al. | |
| 6,577,631 B1 | 6/2003 | Keenan et al. | |
| 6,600,776 B1 | 7/2003 | Alamouti et al. | |
| 6,718,159 B1 | 4/2004 | Sato | |
| 6,802,035 B2 | 10/2004 | Catreux et al. | |
| 6,804,491 B1 | 10/2004 | Uesugi | |
| 6,992,622 B1 | 1/2006 | Chiang et al. | |
| 7,020,482 B2 | 3/2006 | Medvedev et al. | |
| 7,058,367 B1 | 6/2006 | Luo et al. | |
| 7,187,949 B2 | 3/2007 | Chang et al. | |
| 7,206,294 B2 * | 4/2007 | Garahi | H04W 88/02 370/315 |
| 7,248,217 B2 | 7/2007 | Mani et al. | |
| 7,248,841 B2 | 7/2007 | Agee et al. | |
| 7,260,141 B2 | 8/2007 | Bierly et al. | |
| 7,333,455 B1 | 2/2008 | Bolt et al. | |
| 7,339,979 B1 | 3/2008 | Kelkar | |
| 7,363,058 B2 | 4/2008 | Gustaf | |
| 7,424,225 B1 * | 9/2008 | Elliott | H04B 10/1149 398/115 |
| 7,574,236 B1 | 8/2009 | Mansour | |
| 7,636,573 B2 | 12/2009 | Walton et al. | |
| 7,688,909 B2 | 3/2010 | Tsutsui | |
| 7,689,216 B2 | 3/2010 | Wandel | |
| 7,710,319 B2 | 5/2010 | Nassiri-Toussi et al. | |
| 7,890,114 B2 | 2/2011 | Braun et al. | |
| 7,904,117 B2 | 3/2011 | Doan et al. | |
| 7,911,985 B2 | 3/2011 | Proctor, Jr. et al. | |
| 7,920,889 B2 | 4/2011 | Hoshino et al. | |
| 7,986,742 B2 | 7/2011 | Ketchum et al. | |
| 8,014,366 B2 | 9/2011 | Wax et al. | |
| 8,098,752 B2 | 1/2012 | Hwang et al. | |
| 8,121,235 B1 | 2/2012 | Sun et al. | |
| 8,126,408 B2 | 2/2012 | Ahrony et al. | |
| 8,140,122 B2 | 3/2012 | Park et al. | |
| 8,160,601 B2 | 4/2012 | Veselinovic et al. | |
| 8,175,184 B2 | 5/2012 | Kim et al. | |
| 8,190,102 B2 | 5/2012 | Rofougaran | |
| 8,203,978 B2 | 6/2012 | Rodney et al. | |
| 8,228,188 B2 | 7/2012 | Key et al. | |
| 8,279,132 B2 | 10/2012 | Jung et al. | |
| 8,280,445 B2 | 10/2012 | Yong et al. | |
| 8,314,736 B2 | 11/2012 | Moshfeghi | |
| 8,320,304 B2 | 11/2012 | Deb et al. | |
| 8,364,188 B2 | 1/2013 | Deb et al. | |
| 8,369,791 B2 | 2/2013 | Hafeez | |
| 8,385,305 B1 | 2/2013 | Negus et al. | |
| 8,385,452 B2 | 2/2013 | Gorokhov | |
| 8,396,157 B2 | 3/2013 | Li et al. | |
| 8,457,798 B2 | 6/2013 | Hackett | |
| 8,462,047 B1 | 6/2013 | Ai et al. | |
| 8,482,462 B2 | 7/2013 | Komijani et al. | |
| 8,570,988 B2 | 10/2013 | Wallace et al. | |
| 8,588,193 B1 | 11/2013 | Ho et al. | |
| 8,620,301 B1 | 12/2013 | Hessel | |
| 8,644,262 B1 | 2/2014 | Sun et al. | |
| 8,654,815 B1 | 2/2014 | Forenza et al. | |
| 8,744,513 B2 | 6/2014 | Chen et al. | |
| 8,750,264 B2 | 6/2014 | Shatti | |
| 8,780,943 B2 | 7/2014 | Moshfeghi | |
| 8,787,469 B2 | 7/2014 | Kim et al. | |
| 8,817,678 B2 | 8/2014 | Moshfeghi | |
| 8,854,255 B1 | 10/2014 | Ehret | |
| 8,885,628 B2 | 11/2014 | Palanki et al. | |
| 9,037,094 B2 | 5/2015 | Moshfeghi | |
| 9,065,515 B2 | 6/2015 | Pezennec et al. | |
| 9,112,648 B2 | 8/2015 | Moshfeghi | |
| 9,185,601 B2 | 11/2015 | Frerking et al. | |
| 9,197,982 B2 | 11/2015 | Moshfeghi | |
| 9,225,482 B2 | 12/2015 | Moshfeghi | |
| 9,226,092 B2 | 12/2015 | Moshfeghi | |
| 9,252,908 B1 | 2/2016 | Branlund | |
| 9,253,587 B2 | 2/2016 | Moshfeghi | |
| 9,438,389 B2 | 9/2016 | Moshfeghi et al. | |
| 9,456,354 B2 * | 9/2016 | Branlund | H04W 16/28 |
| 9,548,805 B2 | 1/2017 | Moshfeghi et al. | |
| 9,602,257 B2 | 3/2017 | Moshfeghi et al. | |
| 9,660,777 B2 | 5/2017 | Moshfeghi et al. | |
| 9,680,554 B2 | 6/2017 | Moshfeghi et al. | |
| 9,686,060 B2 | 6/2017 | Moshfeghi | |
| 9,698,948 B2 | 7/2017 | Moshfeghi | |
| 9,736,637 B2 | 8/2017 | Larsen et al. | |
| 9,780,928 B2 | 10/2017 | Moshfeghi et al. | |

(56) References Cited

U.S. PATENT DOCUMENTS

| | | |
|---|---|---|
| 9,787,103 B1 | 10/2017 | Leabman et al. |
| 9,829,563 B2 | 11/2017 | Xiao et al. |
| 9,923,620 B2 | 3/2018 | Moshfeghi et al. |
| 10,020,861 B2 | 7/2018 | Moshfeghi et al. |
| 10,069,555 B2 | 9/2018 | Islam et al. |
| 10,069,608 B2 | 9/2018 | Moshfeghi et al. |
| 10,084,576 B2 | 9/2018 | Moshfeghi et al. |
| 10,103,853 B2 | 10/2018 | Moshfeghi |
| 10,277,370 B2 | 4/2019 | Moshfeghi |
| 10,320,090 B2 | 6/2019 | Zou et al. |
| 10,348,371 B2 | 7/2019 | Rofougaran et al. |
| 10,560,179 B2 | 2/2020 | Gharavi et al. |
| 10,587,313 B2 | 3/2020 | Yoon et al. |
| 2002/0034958 A1 | 3/2002 | Oberschmidt et al. |
| 2002/0132600 A1 | 9/2002 | Rudrapatna |
| 2002/0193074 A1* | 12/2002 | Squibbs ............. H04L 63/0846 455/45 |
| 2002/0196186 A1 | 12/2002 | Holt |
| 2003/0012208 A1 | 1/2003 | Bernheim et al. |
| 2003/0090418 A1 | 5/2003 | Howell |
| 2003/0125040 A1 | 7/2003 | Walton et al. |
| 2003/0129989 A1 | 7/2003 | Gholmieh et al. |
| 2003/0236109 A1* | 12/2003 | Nagata ................. G06F 3/0338 455/575.1 |
| 2004/0077354 A1 | 4/2004 | Jason et al. |
| 2004/0077379 A1 | 4/2004 | Smith et al. |
| 2004/0082356 A1 | 4/2004 | Walton et al. |
| 2004/0095907 A1 | 5/2004 | Agee et al. |
| 2004/0110469 A1* | 6/2004 | Judd ....................... G01S 19/25 455/15 |
| 2004/0116129 A1 | 6/2004 | Wilson |
| 2004/0127174 A1 | 7/2004 | Frank et al. |
| 2004/0166808 A1 | 8/2004 | Hasegawa et al. |
| 2005/0048964 A1 | 3/2005 | Cohen et al. |
| 2005/0069252 A1 | 3/2005 | Hwang et al. |
| 2005/0088358 A1 | 4/2005 | Larry et al. |
| 2005/0134517 A1 | 6/2005 | Gottl |
| 2005/0136943 A1 | 6/2005 | Banerjee et al. |
| 2005/0181755 A1 | 8/2005 | Hoshino et al. |
| 2005/0232216 A1 | 10/2005 | Webster et al. |
| 2005/0237971 A1 | 10/2005 | Skraparlis |
| 2005/0243756 A1 | 11/2005 | Cleveland et al. |
| 2005/0270227 A1 | 12/2005 | Stephens |
| 2006/0025178 A1 | 2/2006 | Tao et al. |
| 2006/0063494 A1 | 3/2006 | Zhang et al. |
| 2006/0121946 A1 | 6/2006 | Walton et al. |
| 2006/0246922 A1* | 11/2006 | Gasbarro ............. A61B 5/0002 455/456.6 |
| 2006/0267839 A1 | 11/2006 | Vaskelainen et al. |
| 2007/0001924 A1 | 1/2007 | Hirabayashi |
| 2007/0040025 A1 | 2/2007 | Goel et al. |
| 2007/0052519 A1 | 3/2007 | Talty et al. |
| 2007/0066254 A1 | 3/2007 | Tsuchie et al. |
| 2007/0093270 A1 | 4/2007 | Lagnado |
| 2007/0100548 A1 | 5/2007 | Small |
| 2007/0116012 A1 | 5/2007 | Chang et al. |
| 2007/0160014 A1 | 7/2007 | Larsson |
| 2007/0280310 A1 | 12/2007 | Muenter et al. |
| 2008/0025208 A1 | 1/2008 | Chan |
| 2008/0076370 A1 | 3/2008 | Kotecha et al. |
| 2008/0117961 A1 | 5/2008 | Han et al. |
| 2008/0166975 A1 | 7/2008 | Kim et al. |
| 2008/0167049 A1 | 7/2008 | Karr et al. |
| 2008/0212582 A1 | 9/2008 | Zwart et al. |
| 2008/0225758 A1 | 9/2008 | Proctor et al. |
| 2008/0258993 A1 | 10/2008 | Gummalla et al. |
| 2008/0261509 A1 | 10/2008 | Sen |
| 2008/0305820 A1 | 12/2008 | Sadiq et al. |
| 2008/0309555 A1 | 12/2008 | Fan et al. |
| 2008/0315944 A1 | 12/2008 | Brown |
| 2009/0009392 A1 | 1/2009 | Jacomb-Hood et al. |
| 2009/0010215 A1 | 1/2009 | Kim et al. |
| 2009/0028120 A1 | 1/2009 | Lee |
| 2009/0029645 A1* | 1/2009 | Leroudier ............ H04B 7/2606 455/7 |
| 2009/0093265 A1 | 4/2009 | Kimura et al. |
| 2009/0156227 A1 | 6/2009 | Frerking et al. |
| 2009/0161235 A1 | 6/2009 | Border et al. |
| 2009/0224137 A1 | 9/2009 | Hoermann |
| 2009/0233545 A1 | 9/2009 | Sutskover et al. |
| 2009/0325479 A1 | 12/2009 | Chakrabarti et al. |
| 2010/0042881 A1 | 2/2010 | Wong |
| 2010/0080197 A1 | 4/2010 | Kanellakis et al. |
| 2010/0090898 A1 | 4/2010 | Gallagher et al. |
| 2010/0105403 A1 | 4/2010 | Lennartson et al. |
| 2010/0117890 A1 | 5/2010 | Vook et al. |
| 2010/0124895 A1 | 5/2010 | Martin et al. |
| 2010/0136922 A1 | 6/2010 | Rofougaran |
| 2010/0149039 A1 | 6/2010 | Komijani et al. |
| 2010/0167639 A1 | 7/2010 | Ranson et al. |
| 2010/0172309 A1 | 7/2010 | Forenza et al. |
| 2010/0208776 A1 | 8/2010 | Song et al. |
| 2010/0220012 A1 | 9/2010 | Reede |
| 2010/0273504 A1* | 10/2010 | Bull ........................ G01S 5/02 455/456.1 |
| 2010/0284446 A1 | 11/2010 | Mu et al. |
| 2010/0291918 A1 | 11/2010 | Suzuki et al. |
| 2010/0304680 A1 | 12/2010 | Kuffner et al. |
| 2010/0304770 A1 | 12/2010 | Wieffeldt et al. |
| 2010/0311419 A1* | 12/2010 | Bi .......................... H04W 60/00 455/435.1 |
| 2010/0328157 A1 | 12/2010 | Culkin et al. |
| 2011/0002410 A1 | 1/2011 | Forenza et al. |
| 2011/0003610 A1 | 1/2011 | Key et al. |
| 2011/0045764 A1 | 2/2011 | Maruyama et al. |
| 2011/0063181 A1 | 3/2011 | Walker |
| 2011/0069773 A1 | 3/2011 | Doron et al. |
| 2011/0081875 A1* | 4/2011 | Imamura ................. H04B 1/04 455/101 |
| 2011/0105032 A1 | 5/2011 | Maruhashi et al. |
| 2011/0105167 A1 | 5/2011 | Pan et al. |
| 2011/0136478 A1 | 6/2011 | Trigui |
| 2011/0140954 A1 | 6/2011 | Fortuny-Guasch |
| 2011/0142104 A1 | 6/2011 | Coldrey et al. |
| 2011/0149835 A1 | 6/2011 | Shimada et al. |
| 2011/0164510 A1 | 7/2011 | Zheng et al. |
| 2011/0190005 A1 | 8/2011 | Cheon et al. |
| 2011/0194504 A1 | 8/2011 | Gorokhov et al. |
| 2011/0212684 A1 | 9/2011 | Nam et al. |
| 2011/0222616 A1 | 9/2011 | Jiang et al. |
| 2011/0268037 A1 | 11/2011 | Fujimoto |
| 2011/0299441 A1 | 12/2011 | Petrovic et al. |
| 2012/0002742 A1 | 1/2012 | Cheng |
| 2012/0015603 A1 | 1/2012 | Proctor et al. |
| 2012/0034924 A1 | 2/2012 | Kalhan |
| 2012/0057508 A1 | 3/2012 | Moshfeghi |
| 2012/0082070 A1 | 4/2012 | Hart et al. |
| 2012/0082072 A1 | 4/2012 | Shen |
| 2012/0083207 A1 | 4/2012 | Rofougaran et al. |
| 2012/0083223 A1 | 4/2012 | Li et al. |
| 2012/0083225 A1 | 4/2012 | Rofougaran et al. |
| 2012/0083233 A1 | 4/2012 | Rofougaran et al. |
| 2012/0083306 A1 | 4/2012 | Rofougaran et al. |
| 2012/0093209 A1 | 4/2012 | Schmidt et al. |
| 2012/0120884 A1 | 5/2012 | Yu et al. |
| 2012/0129543 A1 | 5/2012 | Patel et al. |
| 2012/0131650 A1* | 5/2012 | Gutt ..................... H04B 7/18593 726/5 |
| 2012/0149300 A1 | 6/2012 | Forster |
| 2012/0184203 A1 | 7/2012 | Tulino et al. |
| 2012/0184219 A1 | 7/2012 | Richardson et al. |
| 2012/0194385 A1 | 8/2012 | Schmidt |
| 2012/0206299 A1 | 8/2012 | Valdes-Garcia |
| 2012/0230274 A1 | 9/2012 | Xiao et al. |
| 2012/0238202 A1 | 9/2012 | Kim et al. |
| 2012/0250659 A1 | 10/2012 | Sambhwani |
| 2012/0257516 A1 | 10/2012 | Pazhyannur et al. |
| 2012/0259547 A1 | 10/2012 | Morlock et al. |
| 2012/0314570 A1 | 12/2012 | Forenza et al. |
| 2013/0027240 A1 | 1/2013 | Chowdhury |
| 2013/0027250 A1 | 1/2013 | Chen |
| 2013/0040558 A1 | 2/2013 | Kazmi |

(56) References Cited

U.S. PATENT DOCUMENTS

| | | |
|---|---|---|
| 2013/0044028 A1 | 2/2013 | Lea et al. |
| 2013/0057447 A1 | 3/2013 | Pivit et al. |
| 2013/0089123 A1 | 4/2013 | Rahul et al. |
| 2013/0094439 A1 | 4/2013 | Moshfeghi |
| 2013/0094440 A1 | 4/2013 | Moshfeghi |
| 2013/0094522 A1 | 4/2013 | Moshfeghi |
| 2013/0094544 A1 | 4/2013 | Moshfeghi |
| 2013/0095747 A1 | 4/2013 | Moshfeghi |
| 2013/0095770 A1 | 4/2013 | Moshfeghi |
| 2013/0095874 A1* | 4/2013 | Moshfeghi ............ H04W 88/06 455/509 |
| 2013/0114468 A1 | 5/2013 | Hui et al. |
| 2013/0155891 A1 | 6/2013 | Dinan |
| 2013/0272220 A1 | 10/2013 | Li et al. |
| 2013/0272437 A1 | 10/2013 | Eidson et al. |
| 2013/0286962 A1 | 10/2013 | Heath, Jr. et al. |
| 2013/0287139 A1* | 10/2013 | Zhu .................... H04N 21/2365 375/295 |
| 2013/0322561 A1 | 12/2013 | Abreu et al. |
| 2013/0324055 A1 | 12/2013 | Kludt et al. |
| 2013/0343235 A1* | 12/2013 | Khan .................... H04B 1/56 370/278 |
| 2014/0003338 A1 | 1/2014 | Rahul et al. |
| 2014/0010319 A1 | 1/2014 | Baik et al. |
| 2014/0016573 A1 | 1/2014 | Nuggehalli et al. |
| 2014/0035731 A1 | 2/2014 | Chan et al. |
| 2014/0044041 A1* | 2/2014 | Moshfeghi ............ H04W 84/00 370/328 |
| 2014/0044042 A1 | 2/2014 | Moshfeghi |
| 2014/0044043 A1 | 2/2014 | Moshfeghi et al. |
| 2014/0045478 A1 | 2/2014 | Moshfeghi |
| 2014/0045541 A1 | 2/2014 | Moshfeghi et al. |
| 2014/0072078 A1 | 3/2014 | Sergeyev et al. |
| 2014/0086191 A1 | 3/2014 | Berntsen et al. |
| 2014/0125539 A1 | 5/2014 | Katipally et al. |
| 2014/0133435 A1 | 5/2014 | Forenza et al. |
| 2014/0198696 A1 | 7/2014 | Li et al. |
| 2014/0241296 A1 | 8/2014 | Shattil |
| 2014/0266866 A1 | 9/2014 | Swirhun et al. |
| 2015/0003307 A1 | 1/2015 | Moshfeghi et al. |
| 2015/0011160 A1 | 1/2015 | Jurgovan et al. |
| 2015/0031407 A1 | 1/2015 | Moshfeghi |
| 2015/0042744 A1 | 2/2015 | Ralston et al. |
| 2015/0091706 A1 | 4/2015 | Chemishkian et al. |
| 2015/0123496 A1 | 5/2015 | Leabman et al. |
| 2015/0229133 A1 | 8/2015 | Reynolds et al. |
| 2015/0241020 A1 | 8/2015 | Lee et al. |
| 2015/0303950 A1 | 10/2015 | Shattil |
| 2015/0318897 A1 | 11/2015 | Hyde et al. |
| 2015/0318905 A1 | 11/2015 | Moshfeghi et al. |
| 2015/0341098 A1 | 11/2015 | Angeletti et al. |
| 2016/0014613 A1 | 1/2016 | Ponnampalam et al. |
| 2016/0043838 A1 | 2/2016 | Moshfeghi et al. |
| 2016/0054440 A1 | 2/2016 | Younis |
| 2016/0094092 A1 | 3/2016 | Davlantes et al. |
| 2016/0094318 A1 | 3/2016 | Shattil |
| 2016/0142114 A1 | 5/2016 | Moshfeghi et al. |
| 2016/0192400 A1 | 6/2016 | Sohn et al. |
| 2016/0203347 A1 | 7/2016 | Bartholomew et al. |
| 2016/0211905 A1 | 7/2016 | Moshfeghi et al. |
| 2016/0219567 A1 | 7/2016 | Gil et al. |
| 2016/1097665 | 7/2016 | Moshfeghi et al. |
| 2016/0285481 A1 | 9/2016 | Cohen |
| 2017/0026218 A1 | 1/2017 | Shattil |
| 2017/0078897 A1 | 3/2017 | Duan et al. |
| 2017/0126374 A1 | 5/2017 | Moshfeghi et al. |
| 2017/0156069 A1 | 6/2017 | Moshfeghi et al. |
| 2017/0201437 A1 | 7/2017 | Balakrishnan et al. |
| 2017/0212208 A1 | 7/2017 | Baek et al. |
| 2017/0230099 A1 | 8/2017 | Moshfeghi et al. |
| 2017/0237290 A1 | 8/2017 | Bakker et al. |
| 2017/0257155 A1 | 9/2017 | Liang et al. |
| 2017/0264014 A1 | 9/2017 | Le-Ngoc |
| 2017/0279573 A1 | 9/2017 | Moshfeghi et al. |
| 2017/0288727 A1 | 10/2017 | Rappaport |
| 2017/0317734 A1 | 11/2017 | Moshfeghi |
| 2017/0317801 A1 | 11/2017 | Moshfeghi et al. |
| 2017/0324480 A1 | 11/2017 | Elmirghani et al. |
| 2017/0338921 A1 | 11/2017 | Moshfeghi |
| 2017/0339625 A1 | 11/2017 | Stapleton |
| 2017/0353338 A1 | 12/2017 | Amadjikpe et al. |
| 2018/0026586 A1 | 1/2018 | Carbone et al. |
| 2018/0041270 A1 | 2/2018 | Buer et al. |
| 2018/0048390 A1 | 2/2018 | Palmer et al. |
| 2018/0090992 A1 | 3/2018 | Shrivastava et al. |
| 2018/0091270 A1 | 3/2018 | Moshfeghi |
| 2018/0115305 A1 | 4/2018 | Islam et al. |
| 2018/0220416 A1 | 8/2018 | Islam et al. |
| 2018/0234158 A1 | 8/2018 | Moshfeghi |
| 2019/0089434 A1 | 3/2019 | Rainish et al. |
| 2019/0230626 A1 | 7/2019 | Rune et al. |
| 2019/0319754 A1 | 10/2019 | Moshfeghi |
| 2019/0319755 A1 | 10/2019 | Moshfeghi |
| 2019/0319756 A1 | 10/2019 | Moshfeghi |

FOREIGN PATENT DOCUMENTS

| | | |
|---|---|---|
| WO | 2008027531 A2 | 3/2008 |
| WO | 2012055468 A1 | 5/2012 |
| WO | 2013058998 A2 | 4/2013 |
| WO | 2013058999 A2 | 4/2013 |
| WO | 2016115545 A2 | 7/2016 |
| WO | 2016115545 A3 | 10/2016 |

OTHER PUBLICATIONS

Baggett, Benjamin M.W. Optimization of Aperiodically Spaced Phased Arrays for Wideband Applications. MS Thesis. Virginia Polytechnic Institute and State University, 2011, pp. 1-137.

Corrected Notice of Allowability for U.S. Appl. No. 15/904,521 dated May 6, 2019.

Corrected Notice of Allowance for U.S. Appl. No. 16/031,007 dated Jul. 8, 2019.

Corrected Notice of Allowance for U.S. Appl. No. 15/607,743 dated May 10, 2019.

Corrected Notice of Allowance for U.S. Appl. No. 15/904,521 dated Jun. 21, 2019.

Corrected Notice of Allowance for U.S. Appl. No. 15/904,521 dated May 10, 2019.

Corrected Notice of Allowance for U.S. Appl. No. 13/473,180 dated Jun. 11, 2014.

Corrected Notice of Allowance for U.S. Appl. No. 15/904,521.

Corrected Notice of Allowance for U.S. Appl. No. 16/031,007 dated Aug. 5, 2019.

Corrected Notice of Allowance in U.S. Appl. No. 15/607,743 dated Apr. 3, 2019.

Corrected Notice of Allowance in U.S. Appl. No. 15/835,971 dated Jul. 23, 2018.

Dennis R Morgan et al., "A same-frequency cellular repeater using adaptive feedback cancellation," Global Communications Conference (GLOBECOM), 2012 IEEE, IEEE, (2012) XP032375270, pp. 3825-3830, 2012.

Ex Parte Quayle Action for U.S. Appl. No. 16/032,668 dated Jul. 10, 2019.

Examiner's Answer to Appeal Brief for U.S. Appl. No. 13/473,144 dated Jul. 26, 2017.

Examiner's Answer to Appeal Brief for U.S. Appl. No. 13/473,160 dated Dec. 24, 2015.

Examiner's Answer to Appeal Brief for U.S. Appl. No. 13/919,932 dated Jan. 10, 2017.

Final Office Action for U.S. Appl. No. 13/473,144 dated Jul. 28, 2016.

Final Office Action for U.S. Appl. No. 13/473,144 dated Aug. 14, 2014.

Final Office Action for U.S. Appl. No. 13/919,932 dated Oct. 23, 2015.

Final Office Action for U.S. Appl. No. 13/919,972 dated Jan. 21, 2016.

(56) References Cited

OTHER PUBLICATIONS

Final Office Action for U.S. Appl. No. 14/940,130 dated Oct. 14, 2016.
Final Office Action for U.S. Appl. No. 16/129,413 dated Aug. 13, 2019.
Final Office Action for U.S. Appl. No. dated Oct. 22, 2014.
International Preliminary Report on Patentability for International Patent PCT/US2012/058839, 5 pages, dated Apr. 22, 2014.
International Preliminary Report on Patentability for International Patent PCT/US2012/058839, dated Apr. 22, 2014.
International Preliminary Report on Patentability for International Patent PCT/US2012/058842, 5 pages, dated Apr. 22, 2014.
International Search Report and the Written Opinion of the International Searching Authority in International application No. PCT/US12/58839, 6 pages, dated Apr. 4, 2013.
International Search Report and the Written Opinion of the International Searching Authority in International application No. PCT/US12/58842, 6 pages, dated Jan. 4, 2013.
International Search Report in PCT/US2018/064184 dated Jul. 1, 2019.
Invitation to Pay Additional Fees and, Where Applicable, Protest Fee, with Partial Search Report for PCT Appl No. PCT/US2018/064184 dated Apr. 10, 2019.
K. Han and K. Huang, "Wirelessly Powered Backscatter Communication networks: Modeling, Coverage and Capacity," Apr. 9, 2016, Arxiv.com.
List of References cited by Applicant and considered by Applicant for U.S. Appl. No. 14/325,218 dated Apr. 21, 2017.
Non-Final Office Action for U.S. Appl. No. 13/473,083 dated Mar. 3, 2014.
Non-Final Office Action for U.S. Appl. No. 13/473,096 dated Apr. 23, 2014.
Non-Final Office Action for U.S. Appl. No. 13/473,096 dated Dec. 9, 2013.
Non-Final Office Action for U.S. Appl. No. 13/473,096 dated Nov. 3, 2014.
Non-Final Office Action for U.S. Appl. No. 13/473,105 dated Nov. 25, 2013.
Non-Final Office Action for U.S. Appl. No. 13/473,113 dated Oct. 2, 2014.
Non-Final Office Action for U.S. Appl. No. 13/473,144 dated Feb. 6, 2014.
Non-Final Office Action for U.S. Appl. No. 13/473,144 dated Feb. 9, 2015.
Non-Final Office Action for U.S. Appl. No. 13/473,144 dated Oct. 7, 2015.
Non-Final Office Action for U.S. Appl. No. 13/473,160 dated Jan. 15, 2014.
Non-Final Office Action for U.S. Appl. No. 13/473,180 dated Sep. 12, 2013.
Non-Final Office Action for U.S. Appl. No. 13/919,922 dated Jan. 30, 2015.
Non-Final Office Action for U.S. Appl. No. 13/919,932 dated Feb. 6, 2015.
Non-Final Office Action for U.S. Appl. No. 13/919,958 dated Jan. 5, 2015.
Non-Final Office Action for U.S. Appl. No. 13/919,967 dated Feb. 9, 2015.
Non-Final Office Action for U.S. Appl. No. 13/919,972 dated Jun. 4, 2015.
Non-Final Office Action for U.S. Appl. No. 14/455,859 dated Nov. 13, 2015.
Notice of Allowance in U.S. Appl. No. 15/835,971 dated May 29, 2018.
Notice of Allowance in U.S. Appl. No. 15/904,521 dated Mar. 20, 2019.
Notice of Allowance issued in U.S. Appl. No. 16/129,423 dated Jul. 15, 2019.
Patent Board Decision—Examiner Affirmed for U.S. Appl. No. 13/473,144 dated Jun. 4, 2018.
Patent Board Decision—Examiner Affirmed in Part for U.S. Appl. No. 13/473,160 dated Feb. 21, 2017.
Patent Board Decision—Examiner Reversed for U.S. Appl. No. 13/919,932 dated Dec. 19, 2017.
Response to Rule 312 Communication for U.S. Appl. No. 15/834,894 dated Apr. 19, 2019; Miscellaneous Communication to Applicant for U.S. Appl. No. 15/834,894 dated Apr. 19, 2019.
Restriction Requirement for U.S. Appl. No. 15/893,626 dated Aug. 12, 2016.
Shimin Gong et al., "Backscatter Relay Communications Powered by Wireless Energy Beamforming," IEEE Trans. on Communication, 2018.
USPTO Miscellaneous communication for U.S. Appl. No. 15/834,894 dated Apr. 19, 2019.
Zeng et al., "Joint relay selection and beamforming for mmWave fronthauling network," 2017 IEEE/CIC International Conference on Communications in China, Oct. 22, 2017, 6 pages.
Non-Final Office Action for U.S. Appl. No. 14/709,136 dated Sep. 28, 2016.
Non-Final Office Action for U.S. Appl. No. 14/813,058 dated Jun. 10, 2016.
Non-Final Office Action for U.S. Appl. No. 14/940,130 dated Apr. 6, 2016.
Non-Final Office Action for U.S. Appl. No. 14/980,281 dated Apr. 20, 2016.
Non-Final Office Action for U.S. Appl. No. 14/980,338 dated Mar. 14, 2017.
Non-Final Office Action for U.S. Appl. No. 15/229,135 dated Dec. 21, 2017.
Non-Final Office Action for U.S. Appl. No. 15/372,417 dated May 3, 2018.
Non-Final Office Action for U.S. Appl. No. 15/441,209 dated Jul. 3, 2018.
Non-Final Office Action for U.S. Appl. No. 15/595,940 dated Nov. 17, 2017.
Non-Final Office Action for U.S. Appl. No. 15/616,911 dated Jan. 3, 2019.
Non-Final Office Action for U.S. Appl. No. 15/706,759 dated Jun. 12, 2018.
Non-Final Office Action for U.S. Appl. No. 15/893,626 dated Jun. 12, 2018.
Non-Final Office Action for U.S. Appl. No. 16/101,044 dated Dec. 26, 2018.
Non-Final Office Action for U.S. Appl. No. 16/125,757 dated Aug. 9, 2019.
Non-Final Office Action for U.S. Appl. No. 16/129,413 dated Feb. 4, 2019.
Non-Final Office Action for U.S. Appl. No. 16/129,423 dated Feb. 4, 2019.
Non-Final Office Action for U.S. Appl. No. 16/377,980 dated Aug. 21, 2019.
Non-Final Office Action in U.S. Appl. No. 15/432,091 dated Nov. 22, 2017.
Non-Final Office Action in U.S. Appl. No. 16/111,326 dated Mar. 1, 2019.
Notice of Allowance for U.S. Appl. No. 13/473,083 dated Jan. 7, 2015.
Notice of Allowance for U.S. Appl. No. 13/473,096 dated Apr. 17, 2015.
Notice of Allowance for U.S. Appl. No. 13/473,105 dated Jun. 10, 2014.
Notice of Allowance for U.S. Appl. No. 13/473,113 dated Aug. 10, 2015.
Notice of Allowance for U.S. Appl. No. 13/473,160 dated May 25, 2017.
Notice of Allowance for U.S. Appl. No. 13/473,180 dated May 1, 2014.
Notice of Allowance for U.S. Appl. No. 13/919,922 dated Oct. 27, 2015.
Notice of Allowance for U.S. Appl. No. 13/919,932 dated Feb. 28, 2018.
Notice of Allowance for U.S. Appl. No. 13/919,958 dated Sep. 2, 2015.

(56) References Cited

OTHER PUBLICATIONS

Notice of Allowance for U.S. Appl. No. 13/919,967 dated Jul. 29, 2019.
Notice of Allowance for U.S. Appl. No. 13/919,972 dated Dec. 20, 2016.
Notice of Allowance for U.S. Appl. No. 14/325,218 dated Dec. 19, 2016.
Notice of Allowance for U.S. Appl. No. 14/455,859 dated Apr. 20, 2016.
Notice of Allowance for U.S. Appl. No. 14/709,136 dated Feb. 16, 2017.
Notice of Allowance for U.S. Appl. No. 14/813,058 dated Nov. 7, 2016.
Notice of Allowance for U.S. Appl. No. 14/940,130 dated Feb. 1, 2017.
Notice of Allowance for U.S. Appl. No. 14/980,281 dated Feb. 7, 2017.
Notice of Allowance for U.S. Appl. No. 14/980,338 dated Feb. 22, 2018.
Notice of Allowance for U.S. Appl. No. 15/229,135 dated May 22, 2018.
Notice of Allowance for U.S. Appl. No. 15/372,417 dated Dec. 7, 2018.
Notice of Allowance for U.S. Appl. No. 15/441,209 dated Dec. 28, 2018.
Notice of Allowance for U.S. Appl. No. 15/472,148 dated Dec. 10, 2018.
Notice of Allowance for U.S. Appl. No. 15/595,919 dated Jun. 5, 2019.
Notice of Allowance for U.S. Appl. No. 15/595,940 dated May 1, 2018.
Notice of Allowance for U.S. Appl. No. 15/616,911 dated Jul. 24, 2019.
Notice of Allowance for U.S. Appl. No. 16/129,423 dated Jul. 15, 2019.
Notice of Allowance for U.S. Appl. No. 16/382,386 dated Jul. 24, 2019.
Notice of Allowance for U.S. Appl. No. 16/031,007 dated May 2, 2019.
Notice of Allowance in U.S. Appl. No. 15/432,091 dated Apr. 11, 2018.
Notice of Allowance in U.S. Appl. No. 15/607,743 dated Jan. 22, 2019.
Notice of Allowance in U.S. Appl. No. 15/834,894 dated Feb. 20, 2019.
Corrected Notice of Allowance for U.S. Appl. No. 16/031,007 dated Sep. 16, 2019.
Corrected Notice of Allowance for U.S. Appl. No. 15/616,911 dated Oct. 31, 2019.
Corrected Notice of Allowance for U.S. Appl. No. 16/031,007 dated Oct. 22, 2019.
Corrected Notice of Allowance for U.S. Appl. No. 16/032,617 dated Oct. 28, 2019.
Corrected Notice of Allowance for U.S. Appl. No. 16/129,423 dated Nov. 7, 2019.
Final Office Action for U.S. Appl. No. 16/125,757 dated Dec. 2, 2019.
Misc Communication from USPTO for U.S. Appl. No. 16/382,386 dated Oct. 8, 2019.
Notice of Allowance for U.S. Appl. No. 16/129,423 dated Nov. 27, 2019.
Non-Final Office Action for U.S. Appl. No. 16/294,025 dated Sep. 12, 2019.
Non-Final Office Action for U.S. Appl. No. 16/526,544 dated Sep. 18, 2019.
Non-Final Office Action in U.S. Appl. No. 15/836,198 dated Oct. 31, 2019.
Notice of Allowance for U.S. Appl. No. 16/032,668 dated Sep. 20, 2019.
Notice of Allowance for U.S. Appl. No. 15/595,919 dated Oct. 25, 2019.
Notice of Allowance for U.S. Appl. No. 15/904,521 dated Sep. 20, 2019.
Notice of Allowance for U.S. Appl. No. 16/111,326 dated Oct. 10, 2019.
Corrected Notice of Allowability for U.S. Appl. No. 16/111,326 dated Mar. 9, 2020.
Corrected Notice of Allowance for U.S. Appl. No. 15/616,911 dated Jan. 24, 2020.
Corrected Notice of Allowance for U.S. Appl. No. 15/904,521 dated Mar. 12, 2020.
Corrected Notice of Allowance for U.S. Appl. No. 16/032,668 dated Mar. 23, 2020.
Corrected Notice of Allowance for U.S. Appl. No. 16/129,423 dated Jan. 23, 2020.
Corrected Notice of Allowance for U.S. Appl. No. 16/382,386 dated Feb. 6, 2020.
Final Office Action for U.S. Appl. No. 16/377,980 dated Mar. 4, 2020.
Final Office Action for U.S. Appl. No. 16/526,544 dated Feb. 12, 2020.
Non-Final Office Action for U.S. Appl. No. 16/125,757 dated Mar. 23, 2020.
Non-Final Office Action for U.S. Appl. No. 16/129,413 dated Feb. 12, 2020.
Non-Final Office Action for U.S. Appl. No. 16/666,680 dated Feb. 19, 2020.
Supplemental Notice of Allowance for U.S. Appl. No. 16/032,668 dated Feb. 14, 2020.
Supplemental Notice of Allowance for U.S. Appl. No. 16/129,423 dated Mar. 3, 2020.
Supplemental Notice of Allowance for U.S. Appl. No. 16/294,025 dated Mar. 25, 2020.
Corrected Notice of Allowance for U.S. Appl. No. 16/526,544 dated May 13, 2020.
Corrected Notice of Allowance for U.S. Appl. No. 15/836,198 dated May 22, 2020.
Corrected Notice of Allowance for U.S. Appl. No. 16/111,326 dated Apr. 23, 2020.
Corrected Notice of Allowance for U.S. Appl. No. 16/294,025 dated May 18, 2020.
Notice of Allowance for U.S. Appl. No. 16/526,544 dated Apr. 9, 2020.
Final Office Action for U.S. Appl. No. 16/388,043 dated Apr. 15, 2020.
Notice of Allowance for U.S. Appl. No. 16/377,980 dated Apr. 14, 2020.
Notice of Allowance for U.S. Appl. No. 15/836,198 dated Apr. 17, 2020.
Non-Final Office Action for U.S. Appl. No. 16/153,735 dated May 13, 2020.
Non-Final Office Action for U.S. Appl. No. 16/364,956 dated Apr. 10, 2020.
Non-Final Office Action for U.S. Appl. No. 16/377,847 dated Apr. 20, 2020.
Non-Final Office Action for U.S. Appl. No. 16/675,290 dated Apr. 30, 2020.
Notice of Allowance for U.S. Appl. No. 15/256,222 dated Apr. 3, 2020.
Notice of Allowance for U.S. Appl. No. 15/607,750 dated Jun. 1, 2020.
Final Office Action for U.S. Appl. No. 15/256,222 dated Oct. 4, 2019.
Non-Final Office Action for U.S. Appl. No. 15/256,222 dated Aug. 27, 2018.
Non-Final Office Action for U.S. Appl. No. 15/256,222 dated Mar. 21, 2019.

* cited by examiner

METHOD AND SYSTEM FOR DISTRIBUTED TRANSCEIVERS AND MOBILE DEVICE CONNECTIVITY

CROSS-REFERENCE TO RELATED APPLICATIONS/INCORPORATION BY REFERENCE

This application is a continuation application of U.S. patent application Ser. No. 16/016,619, filed Jun. 24, 2018. U.S. patent application Ser. No. 16/016,619 is a continuation application of U.S. patent application Ser. No. 13/919,932, filed Jun. 17, 2013, patented as U.S. Pat. No. 10,020,861. U.S. patent application Ser. No. 13/919,932 makes reference to, claims priority to and claims the benefit of U.S. Provisional Application Ser. No. 61/725,005, which was filed on Nov. 11, 2012; and U.S. Provisional Application Ser. No. 61/680,872, which was filed on Aug. 8, 2012. U.S. patent application Ser. No. 16/016,619; and U.S. patent application Ser. No. 13/919,932, issued as U.S. Pat. No. 10,020,861 are incorporated herein by reference.

This application also makes reference to:
U.S. application Ser. No. 13/473,096, which was filed on May 16, 2012;
U.S. application Ser. No. 13/473,144, which was filed on May 16, 2012;
U.S. application Ser. No. 13/473,105, which was filed on May 16, 2012;
U.S. application Ser. No. 13/473,160, which was filed on May 16, 2012;
U.S. application Ser. No. 13/473,180, which was filed on May 16, 2012;
U.S. application Ser. No. 13/473,113, which was filed on May 16, 2012;
U.S. application Ser. No. 13/473,083, which was filed on May 16, 2012;
U.S. application Ser. No. 14/918,922, which was filed on Jun. 17, 2013
U.S. application Ser. No. 13/919,958, which was filed on Jun. 17, 2013
U.S. application Ser. No. 13/919,967, which was filed on Jun. 17, 2013; and
U.S. application Ser. No. 13/919,972, which was filed on Jun. 17, 2013

Each of the above referenced application is hereby incorporated herein by reference in its entirety.

FIELD OF THE INVENTION

Certain embodiments of the invention relate to wireless communication systems. More specifically, certain embodiments of the invention relate to a method and system for distributed transceivers and mobile device connectivity.

BACKGROUND OF THE INVENTION

Millimeter Wave (mmWave) devices are being utilized for high throughput wireless communications at very high carrier frequencies. There are several standards bodies such as, for example, 60 GHz wireless standard, WirelessHD, WiGig, and WiFi IEEE 802.11ad that utilize high frequencies such as the 60 GHz frequency spectrum for high throughput wireless communications. In the US, the 60 GHz spectrum band may be used for unlicensed short range data links such as data links within a range of 1.7 km, with data throughputs up to 6 Gbits/s. These higher frequencies may provide smaller wavelengths and enable the use of small high gain antennas. However, these higher frequencies may experience high propagation loss.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for distributed transceivers and mobile connectivity, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
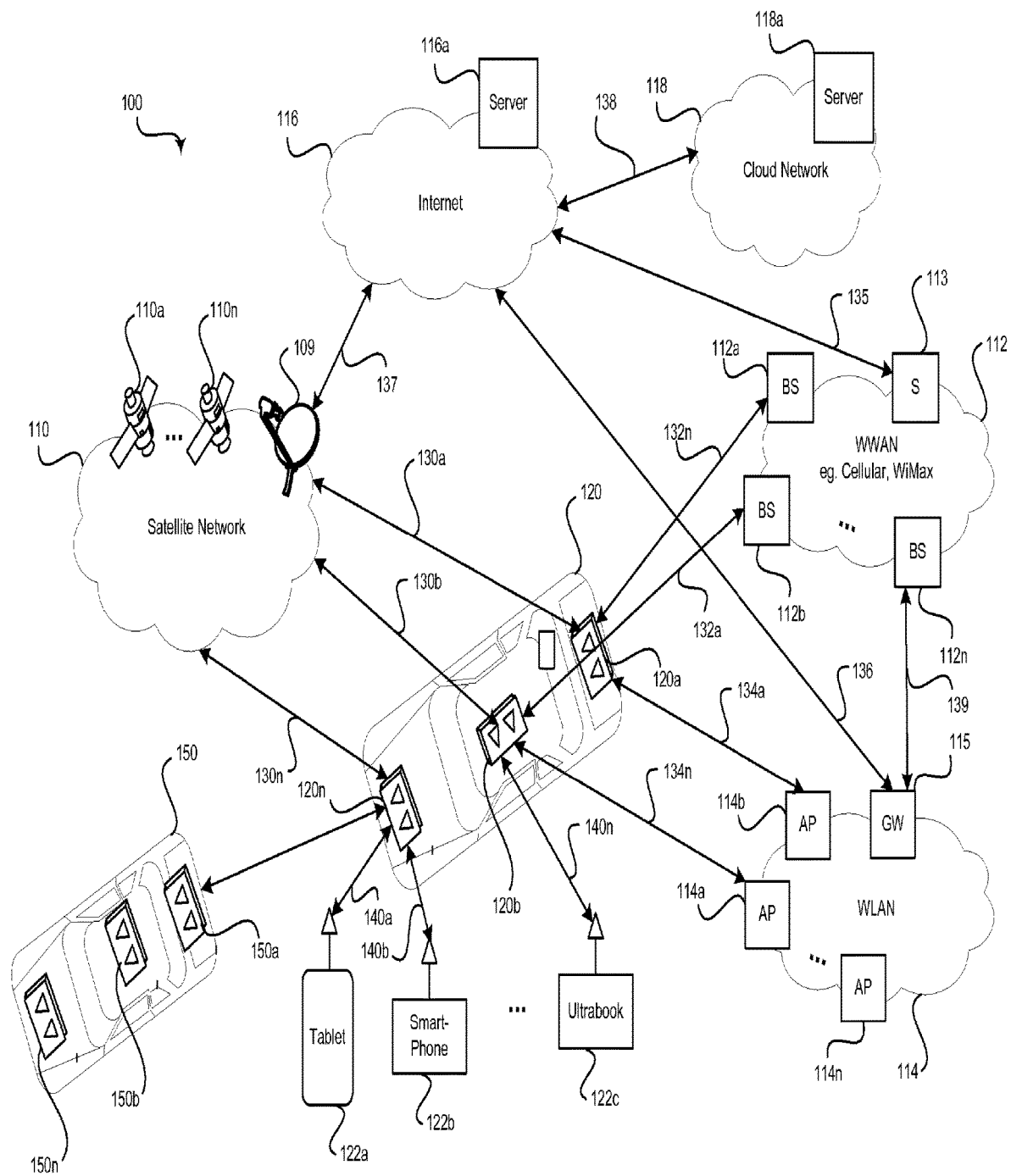
FIG. 1 is a block diagram of an exemplary system for providing connectivity via a plurality of distributed transceivers in a mobile entity, in accordance with an exemplary embodiment of the invention.

Certain embodiments of the invention may be found in a method and system for distributed transceivers and mobile connectivity. In various aspects of the invention, a plurality of distributed transceivers and/or one or more corresponding antenna arrays, which may be communicatively coupled to one or more of the plurality of distributed transceivers, may be configured to handle communication of one or more data streams among one or more of a plurality of wireless communication networks, one or more other mobile entities and/or one or more mobile communication devices. The one or more data streams may be communicated utilizing the configured one or more of the plurality of distributed transceivers and/or the one or more corresponding antenna arrays. The mobile entity may comprise a car, a truck, an omnibus (bus), a trailer, a mobile home, train, bus, a forklift, construction equipment, a boat, a ship, an aircraft or any other vehicle. Some embodiments may be applicable to scenarios where the mobile entity is a stationary entity/ station or fixed entity/station. The plurality of wireless communication networks may comprise a satellite network, a wireless wide area network, a wireless medium area network, a wireless local area network, a wireless personal area network, a network cloud and/or the Internet. Configuring of the one or more of the plurality of distributed transceivers and/or the one or more corresponding antenna arrays may be controlled from a component and/or within one or more of the mobile entities, the one or more other mobile entities, the one or more mobile communication devices and/or one or more of the wireless communication networks.

In some embodiments of the invention, one or more of the plurality of distributed transceivers may be configured to operate as a relay node and/or a repeater node. A location, speed and/or trajectory of the mobile entity may be determined and one or more of the plurality of distributed transceivers and/or one or more corresponding antenna arrays may be configured based on the determined location, speed and/or trajectory. One or more of the plurality of distributed transceivers may be dynamically and/or adaptively controlled to utilize one or more modes of operation to communicate the one or more data streams and/or to split the communication of the one or more data streams amongst a portion of the plurality of distributed transceivers. The modes of operation may comprise a spatial diversity mode, a frequency diversity mode, a spatial multiplexing mode, a frequency multiplexing mode and/or a MIMO mode.

In accordance with various embodiments of the invention, traffic may be backhauled from the mobile entity and/or the one or more other mobile entities via one or more wireless communication links to one or more of the plurality of wireless communication networks. One or more of the plurality of distributed transceivers in the mobile entity and/or the one or more other mobile entities may be configured to utilize different types of communication links to handle different types of data traffic. One or more of the plurality of distributed transceivers in the mobile entity and/or one or more of a plurality of distributed transceivers in the one or more other mobile entities may be configured to utilize different modulation schemes, constellations, protocols, frequencies, wireless standards and/or bandwidths to handle the communication of the one or more data streams.

FIG. 1 is a block diagram of an exemplary system for providing connectivity via a plurality of distributed transceivers in a mobile entity, in accordance with an exemplary embodiment of the invention. Referring to FIG. 1, there is shown a network 100 comprising a satellite network 110, a wireless wide area network (WWAN) 112, a wireless local area network (WLAN) 114, the Internet 116 and a cloud network 118. FIG. 1 also shows mobile entities 120, 150, a tablet 122a, a smartphone 122b, a ultrabook 122c and a plurality of communication links 130a, 130b, ..., 130n, 132a, ..., 132n, 134a, ..., 134n, 133, 135, 136, 137, 138, 139, 140a, 140b, ..., 140n. The tablet 122a, the smartphone 122b and the ultrabook 122c may be collectively referenced as communication devices.

The satellite network 110 may comprise a satellite ground station 109 and a plurality of satellites 110a, ..., 110n that may be operable to convey content to a plurality of receiving devices. In this regard, the satellite ground station 109 may comprise suitable devices having various logic, interfaces and/or code that may be operable to transmit content to the satellites 110a, ..., 110n. The satellites 110a, ..., 110n may be operable to broadcast the corresponding received content, which may be received by a plurality of receiving devices.

For example, a plurality of distributed transceivers 120a, 120b, ..., 120n in the mobile entity 120 may be operable to receive the signals that are broadcast from one or more of the satellites 110a, ..., 110n. The content may be processed and/or communicated to one or more of the tablet 122a, the smartphone 122b, and/or ultrabook 122c via one or more of the plurality of distributed transceivers 120a, 120b, ..., 120n. In some embodiments of the invention, the content may be processed and/or communicated to one or more of the base stations 112a, 112b, ..., 112n in the WWAN 112, the access points 114a, 114b, ..., 114n in the WLAN 114 and/or to another mobile entity such as the mobile entity 150. In some embodiments of the invention, the content may be processed and/or communicated or relayed from one or more of a plurality of the distributed transceivers 120a, 120b, ..., 120n, which are located in the mobile entity 120 to one or more of a plurality of distributed transceivers 150a, 150b, ..., 150n, which are located in the mobile entity 150. In some embodiments, the satellite 110a in FIG. 1 may deploy distributed transceivers to provide higher capacity (multiple streams in the same frequency) to the mobile entity 120. In this case, in accordance with various embodiments of the invention, phase condition optimization (e.g., $\theta_{12}-\theta_{11}+\theta_{21}-\theta_{22}=(2n+1)\times 180°$) may be performed over a plurality of distributed transceivers at the satellite 110a and the mobile entity 120.

The wireless wide area network (WWAN) 112 may comprise suitable logic, interfaces and/or devices that may be operable to provide wide area wireless connectivity. In this regard, the wireless wide area network 112 may enable communication via one or more WWAN based standards and/or protocols such as 3G, 4G, LTE and WiMax. The WWAN 112 may comprise a plurality of base stations, namely, base stations 112a, 112b, ..., 112n and a WWAN switch (S) 113. Content from the one or more of the Internet 116, the cloud network 118, the WWAN 112 and/or the WLAN 114 may be communicated among one or more of the tablet 122a, the smartphone 122b, and/or ultrabook 122c via one or more of the plurality of distributed transceivers 120a, 120b, ..., 120n in the mobile entity 120 via one or more of the plurality of base stations 112a, 112b, ..., 112n. In some embodiments of the invention, the plurality of base stations 112a, 112b, ..., 112n may each deploy distributed transceivers. In some embodiments of the invention, the content may be processed and/or communicated among one or more of the tablet 122a, the smartphone 122b, and/or ultrabook 122c via the gateway 115 and one or more of the access points 114a, 114b, ..., 114n, which are in the WLAN 114. In some embodiments of the invention, the content may be processed and/or communicated or relayed from one or more of a plurality of the distributed transceivers 120a, 120b, ..., 120n, which are located in the mobile entity 120 to one or more of a plurality of the distributed transceivers 150a, 150b, ..., 150n, which are located in the mobile entity 150.

The WWAN switch 113 may comprise suitable logic, interfaces and/or devices that may be operable to provide switching and/or routing functionality for the WWAN 112. The WWAN switch 113 may be communicatively coupled to the Internet via the communication link 135, which may comprise a wired, wireless and/or optical communication link. The WWAN switch 113 may be operable to route traffic from one or more of the base stations 112a, 112b, ..., 112n to the Internet 116 via the communication link 135. The base station 112n may be operable to provide service to the gateway 115 via the communication link 139, which may comprise a wireless WWAN communication link.

The wireless local area network (WLAN) 114 may comprise suitable logic, interfaces and/or devices that may be operable to provide local area wireless connectivity. In this regard, the wireless local area network (WLAN) 114 may enable communication via IEEE 802.11 based standards and/or protocols such as 802.11 a/b/g/n/ac/p/q and/or variants thereof. The WLAN 114 may comprise a plurality of access points, namely, access points 114a, . . . , 114n and a gateway (GW) 115.

Each of the access points 114a, . . . , 114n may comprise suitable logic, interfaces and/or code that may be operable to provide wireless access to the WLAN 114. The access points 114a, . . . , 114n may be communicatively coupled to the gateway 115 via one or more wired, wireless and/or optical links. The access points 114a, . . . , 114n may be operable to communicate via, for example, IEEE 802.11 based standards such as 802.11 a/b/g/n/ac/p/q and/or variants thereof and/or via mmWave standards and/or technologies, such as 60 GHz wireless standard, WirelessHD, WiGig, WiFi, and/or IEEE 802.11ad. The access points 114a, . . . , 114n may enable communication between the WLAN 114 and one or more of the transceivers 120a, 120b, . . . , 120n, which are located in the mobile entity 120, when the mobile entity 120 is within operating range of one or more of the access points 114a, . . . , 114n. In some embodiments of the invention, access points 114a, . . . , 114n may each deploy distributed transceivers. In some embodiments, access points 114a, . . . , 114n may use the methods disclosed in U.S. application Ser. No. 14/919,922, which is hereby incorporated herein by reference in its entirety, to operate and/or control a set of distributed access points with distributed transceivers.

The gateway 115 may comprise suitable logic, circuitry, interfaces and/or code that may be operable to provide connectivity between the access points 114a, . . . , 114n and one or more networks such as the Internet 116. The gateway 115 may be operable to wirelessly communicate with the access points 114a, . . . , 114n via IEEE 802.11 based standards such as 802.11 a/b/g/n/ac/p/q and/or variants thereof. The gateway 115 may be operable to communicate with the access points 114a, . . . , 114n utilizing wired based standards such as 802.3 and variants thereof. The gateway 115 may also be communicatively coupled to the WWAN 112. In this regard, the gateway 115 may also be communicatively coupled to the base station WWAN 112n via the communication link 139. The communication link 139 may comprise, for example, a wireless communication link.

The Internet 116 may comprise suitable devices and/or interfaces that enable the interconnection of a plurality of networks and/or devices. In this regard, the Internet 116 may enable the interconnection of, for example, the satellite network 110, the WWAN 112, the WLAN 114, and the cloud network 118. The Internet 116 may host a plurality of resources such as the server 116a and provide a plurality of Internet-based services.

The cloud network 118 may comprise suitable devices and/or interfaces that are operable to provide one or more services to, for example, the satellite network 110, the WWAN 112, the WLAN 114 and/or to the communication devices, for example, the tablet 122a, the smartphone 122b and the ultrabook 122c. In this regard, the cloud network 118 may, for example, provide storage of information, hosting of information and/or other services for the satellite network 110, the WWAN 112, the WLAN 114, the tablet 122a, the smartphone 122b and/or the ultrabook 122c via the Internet 116. The cloud network 118 may be communicatively coupled to the Internet 116 via the communication link 138.

The cloud network 118 may host a plurality of resources such as the server 118a and provide a plurality of cloud-based services.

The mobile entity 120 may comprise, for example, an automobile such as a car, a truck, an omnibus (bus), a trailer, a mobile home and/or train. The mobile entity 120 may also comprise an aircraft or other type of mobile entity. The mobile entity 120 may comprise a plurality of distributed transceivers 120a, 120b, . . . , 120n. In some embodiments of the invention, the mobile entity 120 may be a semi-stationary or fixed entity (providing the same functionalities and features as the mobile case). For example, it may be installed on a lamp pole, a structure such as a building and/or a roof top. It may be installed, operated, and maintained by a cellular, cable or broadband service provider (e.g., AT&T) or an end user or consumer.

Each of the plurality of distributed transceivers 120a, 120b, . . . , 120n, which are located in the mobile entity 120, may comprise suitable logic, circuitry, interfaces and/or code that may be operable to provide wireless communication as the mobile entity 120 is moving or is stationary. One or more of the distributed transceivers 120a, 120b, . . . , 120n may be operable to communicate with the WWAN 112, the WLAN 114 and/or the satellite network 110. In this regard, one or more of the distributed transceivers 120a, 120b, . . . , 120n may be operable to communicate with the WWAN 112 utilizing a WWAN protocol and/or standard, for example, 3G, 4G, LTE and WiMax. One or more the distributed transceivers 120a, 120b, . . . , 120n may be operable to communicate with the WLAN 114 utilizing, for example, a WLAN protocol and/or standard, which may comprise an IEEE 802.11 based standard such as 802.11 a/b/g/n/ac/p/q and/or variants thereof. One or more the distributed transceivers 120a, 120b, . . . , 120n may also be operable to communicate with the WLAN 114 utilizing, for example, a mmWave protocol and/or standard, which may comprise 60 GHz wireless standard, IEEE 802.11ad, WirelessHD, WiGig, and/or variants thereof. One or more the distributed transceivers 120a, 120b, . . . , 120n may also be operable to receive satellite signals from the satellite network 110 utilizing, for example, a mmWave protocol and/or standard, which may comprise 60 GHz wireless standard, IEEE 802.11ad, WirelessHD, WiGig, and/or variants thereof.

One or more of the plurality of distributed transceivers 120a, 120b, . . . , 120n may be operable to communicate information between the communication devices 122a, 122b, . . . , 122c and one or both of the Internet 116 and/or the cloud network 118. In this regard, one or more of the plurality of distributed transceivers 120a, 120b, . . . , 120n may be operable to communicate data between any of the communication devices 122a, 122b, . . . , 122c and the Internet server 116a and/or the cloud network server 118a. The data may be communicated from any of the communication devices 122a, 122b, . . . , 122c to the Internet server 116a and/or the cloud network server 118a via one or more of the satellite network 110, the WWAN 112, the WLAN 114 and/or the Internet 116.

One or more of the plurality of distributed transceivers 120a, 120b, . . . , 120n may be located within the mobile entity 120 and/or one or more of the plurality of distributed transceivers 120a, 120b, . . . , 120n may be located at various positions, locations and orientations outside of the mobile entity 120. In this regard, one or more of the plurality of distributed transceivers 120a, 120b, . . . , 120n may be operable to communicate with one or more of the satellite network 110, the WWAN 112, the WLAN 114, the Internet 116 and/or the cloud network 118. Similarly, one or more of the plurality of distributed transceivers 150a, 150b, . . . , 150n may be located within the mobile entity 150 and/or one or more of the plurality of distributed transceivers 150a, 150b, . . . , 150n may be located at various positions, locations and orientations outside of the mobile entity 150. In this regard, one or more of the plurality of distributed transceivers 150a, 150b, . . . , 150n may be operable to communicate with one or more of the satellite network 110, the WWAN 112, the WLAN 114, the Internet 116 and/or the cloud network 118. In accordance with an embodiment of the invention, one or more of the plurality of distributed transceivers 120a, 120b, . . . , 120n, which may be located on the outside of the mobile entity 120 may be operable to relay signals and/or otherwise communicate with one or more of the plurality of distributed transceivers 150a, 150b, . . . , 150n in the mobile entity 150. One or more of the plurality of distributed transceivers 120a, 120b, . . . , 120n, which may be located within the mobile entity 120 may be operable to communicate with communication devices that are located within the mobile entity 120. Similarly, one or more of the plurality of distributed transceivers 150a, 150b, . . . , 150n, which may be located within the mobile entity 150 may be operable to communicate with communication devices that are located within the mobile entity 150.

The tablet 122a may comprise suitable logic, circuitry, interfaces and/or code that may be operable to communicate with one or more of the distributed transceivers 120a, 120b, . . . , 120n. In this regard, the tablet 122a may be operable to communicate utilizing, for example, WWAN, WMAN, WLAN, WPAN and/or mmWave technologies, standards and/or protocols. Exemplary, WWAN technologies, standards and/or protocols may comprise 3G, 4G, LTE, and/or WiMax. Exemplary WLAN technologies, standards and/or protocols may comprise an IEEE 802.11 based standard such as 802.11 a/b/g/n/ac/p/q and/or variants thereof. Exemplary mmWave technologies, standards and/or protocols may comprise 60 GHz wireless standard, IEEE 802.11ad, WirelessHD and/or WiGig. In some embodiments of the invention, the tablet 122a may deploy distributed transceivers for any of the protocols and/or carrier frequencies.

The smartphone 122b may comprise suitable logic, circuitry, interfaces and/or code that may be operable to communicate with one or more of the distributed transceivers 120a, 120b, . . . , 120n. In this regard, the smartphone 122b may be operable to communicate utilizing, for example, WWAN, WMAN, WLAN, WPAN and/or mmWave technologies, standards and/or protocols. Exemplary, WWAN technologies, standards and/or protocols may comprise 3G, 4G, LTE, and/or WiMax. Exemplary WLAN technologies, standards and/or protocols may comprise an IEEE 802.11 based standards such as 802.11 a/b/g/n/ac/p/q and/or variants thereof. Exemplary mmWave technologies, standards and/or protocols may comprise 60 GHz wireless standard, IEEE 802.11ad, WirelessHD and/or WiGig. In some embodiments of the invention, the smartphone 122b may deploy distributed transceivers for any of the protocols and/or carrier frequencies.

The ultrabook 122c may comprise suitable logic, circuitry, interfaces and/or code that may be operable to communicate with one or more of the distributed transceivers 120a, 120b, . . . , 120n. In this regard, the ultrabook 122c may be operable to communicate utilizing, for example, WWAN, WMAN, WLAN, WPAN and/or mmWave technologies, standards and/or protocols. Exemplary, WWAN technologies, standards and/or protocols may comprise 3G, 4G, LTE, and/or WiMax. Exemplary WLAN technologies, standards and/or protocols may comprise an IEEE 802.11 based standard such as 802.11 a/b/g/n/ac/p/q and/or variants thereof. Exemplary mmWave technologies, standards and/or protocols may comprise 60 GHz wireless standard, IEEE 802.11ad, WirelessHD and/or WiGig. Although an ultrabook is illustrated, the invention in not necessarily limited in this regard. Accordingly, other similar devices such as a laptop or tablet may be utilized without departing from the spirit and scope of the invention. In some embodiments of the invention, the ultrabook 122c may deploy distributed transceivers for any of the protocols and/or carrier frequencies.

The mobile entity 150 may comprise, for example, an automobile such as a car, a truck, an omnibus (bus), a trailer, a mobile home, train, bus, a forklift, construction equipment, a boat, a ship, an aircraft or any other vehicle. The mobile entity 120 may also comprise an aircraft or other type of mobile entity. The mobile entity 150 may comprise a plurality of distributed transceivers 150a, 150b, . . . , 150n. The mobile entity 150 and the plurality of distributed transceivers 150a, 150b, . . . , 150n may be substantially similar to the mobile entity 120 and the plurality of distributed transceivers 120a, 120b, . . . , 120n, respectively. In accordance with an embodiment of the invention, one or more of the plurality of distributed transceivers 120a, 120b, . . . , 120n in the mobile entity 120 may be operable to communicate or relay content among one or more of the plurality of distributed transceivers 150a, 150b, . . . , 150n in the mobile entity 150.

In accordance with various embodiments of the invention, the distributed transceivers such as the plurality of distributed transceivers 120a, 120b, . . . , 120n, which are located within the mobile entity 120 may be operable to communicate with other networks such as the satellite network 110, the WWAN 112, the WLAN 114, the Internet 116 and/or the cloud network 118. The distributed transceivers such as the plurality of distributed transceivers 120a, 120b, . . . , 120n may also be operable to communicate with one or more of the communication devices 122a, 122b, . . . , 122c. In this regard, for example, one or more of the plurality of distributed transceivers 120a, 120b, . . . , 120n may be operable to communicate content among one or more of the communication devices 122a, 122b, . . . , 122c and/or the Internet 116 and/or the cloud network 118.

In some embodiments of the invention, one or more of the plurality of distributed transceivers 120a, 120b, . . . , 120n may be operable to function as a repeater and/or a relay. In this regard, one or more of the plurality of distributed transceivers 120a, 120b, . . . , 120n may be operable to act as a repeater and/or a relay to communicate signals between one or more of the satellite network 110, the WWAN 112, the WLAN 114, the Internet 116 and/or the cloud network 118 and one or more of the mobile entity 150, the tablet 122a, the smartphone 122b and/or the ultrabook 122c. The repeater and/or relay functionality of the one or more of the plurality of distributed transceivers 120a, 120b, . . . , 120n may be operable when the mobile entry 120 may be stationary or when the mobile entity 120 may be moving.

The reference to 60 GHz wireless connectivity is intended to include all mmWave frequency bands (any carrier frequency above 10 GHz, e.g., 38.6-40 GHz, 59-67 GHz, 71-76 GHz, 92-95 GHz bands). Furthermore, all or a subset of embodiments are applicable to sub-10 GHz carrier frequency operations as well (e.g., 5 GHz and 2.4 GHz ISM bands).

Figure 2:
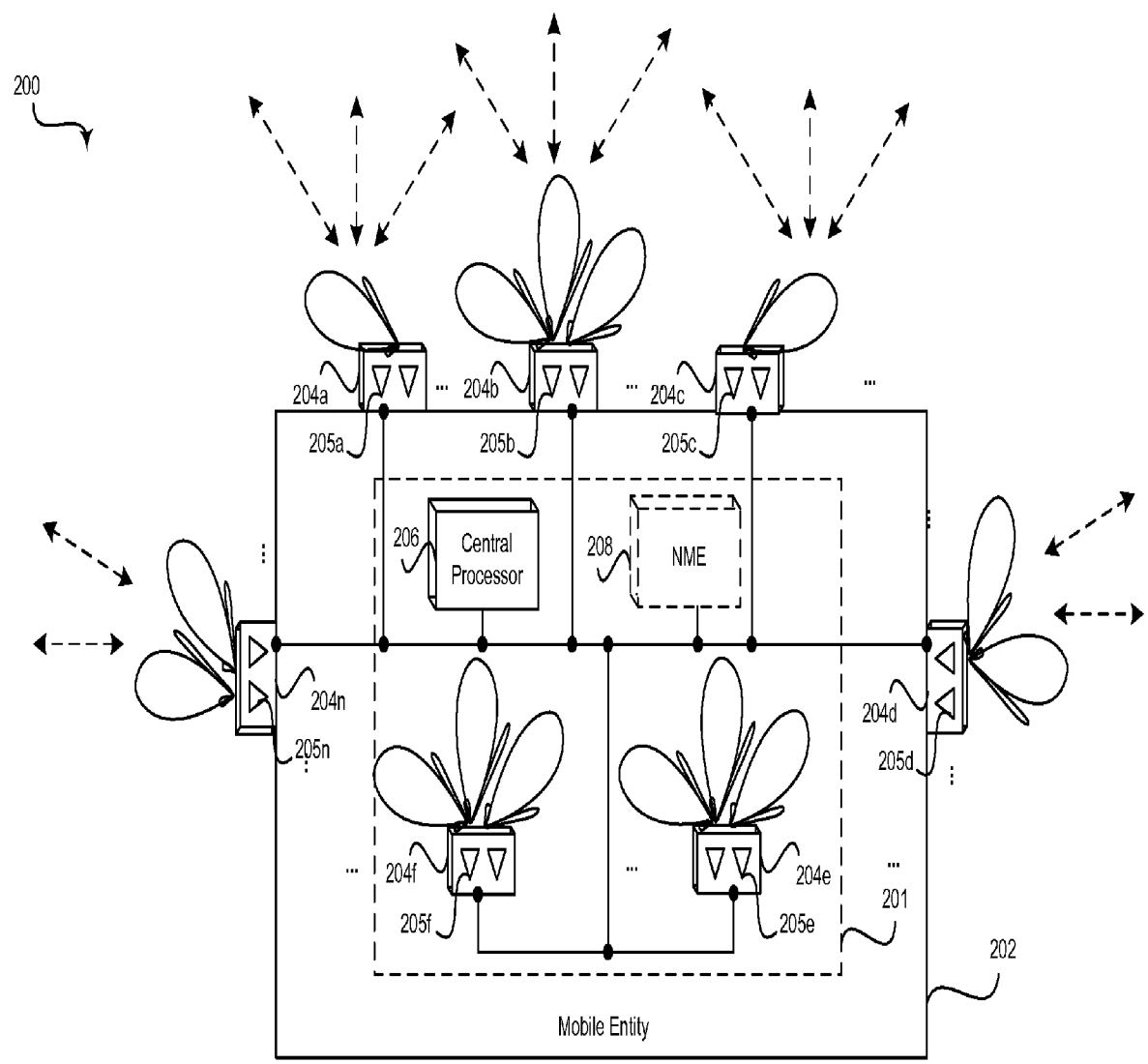
FIG. 2 is a diagram of an exemplary mobile entity, which comprises a plurality of internal and external distributed transceiver devices, in accordance with an exemplary embodiment of the invention.

FIG. 2 is a diagram of an exemplary mobile entity, which comprises a plurality of internal and external distributed transceiver devices, in accordance with exemplary an embodiment of the invention. Referring to FIG. 2, there is shown a mobile entity 200 comprising a plurality of distributed transceivers 204a, 204b, 204c, 204d, 204e, 204f, . . . , 204n. Each of the plurality of distributed transceivers 204a, 204b, 204c, 204d, 204e, 204f, . . . , 204n may comprise a corresponding antenna array 205a, 205b, 205c, 205d, 205e, 205f, . . . , 205n. The mobile entity 200 may comprise a central processor 206 and/or an optional network management engine 208. Reference number 201 represents an interior of the mobile entity 200 and reference number 202 represents an exterior of the mobile entity 200. The distributed transceivers 204a, 204b, 204c, 204d, and 204n may be located on and/or at the exterior of the mobile entity 200. The distributed transceivers 204e, 204f may be located at the interior of the mobile entity 200.

The mobile entity 200 may comprise, for example, an automobile such as a car, a truck, boat, ship, an omnibus (bus), a trailer, a mobile home, train, a forklift, construction equipment, an aircraft or any other type of vehicle. The mobile entity 200 may be substantially similar to the mobile entity 120, which is illustrated and described with respect to FIG. 1, for example.

In some embodiments of the invention, the connection access through the mobile entity 200 may be utilized as a means of conserving battery power for mobile communication devices. Mobile communication devices that are communicatively coupled to the mobile entity 200 as opposed to being direct communicatively coupled to a base station 112a, an access point 114a and/or satellite 110a via the WWAN 112, the WLAN 114, the satellite network 110, respectively, may require less transmit power and less receive processing power, thereby saving their battery power. A network operator may therefore prioritize how the mobile communication devices with low battery charge are communicatively coupled and allow them to connect to the mobile entities, for example the mobile entity 120 of FIG. 1, which have distributed transceivers as opposed to connecting directly to a base station such as the base station 112a in the WWAN 112. In some embodiments the network operator may periodically poll the remaining battery levels of entities 122a, 122b, . . . , 122c to reconfigure the network configuration per some embodiments of this invention.

Each of the plurality of distributed transceivers 204a, 204b, 204c, 204d, 204e, 204f, . . . , 204n may comprise suitable logic, circuitry, interfaces and/or code that may be operable to provide wireless communication when the mobile entity 200 may be moving or may be stationary. One or more of the distributed transceivers 204a, 204b, 204c, 204d, 204e, 204f, . . . , 204n may be operable to communicate with one or more network such as the WWAN 112, the WLAN 114 and/or the satellite network 110, which are shown and described with respect to FIG. 1, for example. In this regard, one or more the distributed transceivers 204a, 204b, 204c, 204d, 204e, 204f, . . . , 204n may be operable to communicate with the WWAN 112 utilizing a WWAN protocol and/or standard, for example, 3G, 4G, LTE and WiMax. One or more the distributed transceivers 204a, 204b, 204c, 204d, 204e, 204f, . . . , 204n may be operable to communicate with the WLAN 114 utilizing, for example, a WLAN protocol and/or standard, which may comprise an IEEE 802.11 based standard such as 802.11 a/b/g/n/ac/p/q and/or variants thereof. One or more the distributed transceivers 204a, 204b, 204c, 204d, 204e, 204f, . . . , 204n may also be operable to communicate with the WLAN 114 utilizing, for example, a mmWave protocol and/or standard, which may comprise 60 GHz wireless standard, IEEE 802.11ad, WirelessHD, WiGig, and/or variants thereof. One or more of the distributed transceivers 204a, 204b, 204c, 204d, 204e, 204f, . . . , 204n may also be operable to receive satellite signals from the satellite network 110 utilizing, for example, a mmWave protocol and/or standard, which may comprise 60 GHz wireless standard, IEEE 802.11ad, WirelessHD, WiGig, and/or variants thereof. In some embodiments of the invention, the transceivers 204a, 204b, 204c, 204d, 204e, 204f, . . . , 204n may only perform radio-frequency up-conversion/down-conversion and/or beam-forming functions. In this case, the interface to the transceivers 204a, 204b, 204c, 204d, 204e, 204f, . . . , 204n from the central processor 206 will be an analog or radio-frequency or intermediate-frequency signal. In this case, digital processing (e.g. modulation/demodulation, equalization, encoding/decoding) for the transceivers 204a, 204b, 204c, 204d, 204e, 204f, . . . , 204n may be performed centrally at the central processor 206.

One or more of the plurality of distributed transceivers 204a, 204b, 204c, 204d, 204e, 204f, . . . , 204n may also be operable to communicate information between the communication devices 122 and one or both of the Internet 111 and/or the cloud network 118, which are shown and described with respect to FIG. 1, for example. In this regard, one or more of the plurality of distributed transceivers 204a, 204b, 204c, 204d, 204e, 204f, . . . , 204n may be operable to communicate data between any of the communication devices 122a, 122b, . . . , 122c and the Internet server 116a and/or the cloud network server 118a. The data may be communicated from any of the communication devices 122a, 122b, . . . , 122c to the Internet server 116a and/or the cloud network server 118a via one or more of the satellite network 110, the WWAN 112, the WLAN 114 and/or the Internet 116. The plurality of distributed transceivers 204a, 204b, 204c, 204d, 204e, 204f, . . . , 204n may be substantially similar to the plurality of distributed transceivers 120a, 120b, . . . , 120n, which are shown and described with respect to FIG. 1, for example.

In general, the plurality of distributed transceivers 204a, 204b, 204c, 204d, 204e, 204f, . . . , 204n may be placed at different points and/or orientations within and/or on the mobile entity 200. In this regard, some of the plurality of distributed transceivers 204a, 204b, 204c, 204d, 204e, 204f, . . . , 204n may be placed and/or oriented so that they may be facing the outside of the mobile entity 200, where they may provide good antenna patterns for outside connections. Others of the plurality of distributed transceivers 204a, 204b, 204c, 204d, 204e, 204f, . . . , 204n may be placed and/or oriented so that they may be facing the inside the mobile entity 200, where they may provide good radiation patterns to relay data to/from devices inside the mobile entity 200. Some of the plurality of distributed transceivers 204a, 204b, 204c, 204d, 204e, 204f, . . . , 204n that may be placed and/or oriented so that they may be facing the outside of the mobile entity 200 may be located at the left side, right side, top, bottom, front and/or rear of the mobile entity 200. The positioning of the plurality of distributed transceivers 204a, 204b, 204c, 204d, 204e, 204f, . . . , 204n at different points and/or orientations within and/or on the mobile entity 200 may ensure that at any direction/orientation of the mobile entity 200, one or more of the plurality of distributed transceivers 204a, 204b, 204c, 204d, 204e, 204f, . . . , 204n may possess good propagation characteristics to one or more of the satellite network 110, the WWAN 112, the WLAN 114, other mobile entities such as the mobile entity 150, and/or one or more of the communication devices 122.

In some instances, the distributed transceivers 204a, 204b, 204c, 204d, and 204n, which may be located on and/or at the exterior of the mobile entity 200 may be more suitable to provide communication with devices that are located within the satellite network 110, the WWAN 112 and/or the WLAN 114 due to less obstruction, configuration, orientation, position and so on. Similarly, in some instances, the distributed transceivers 204e, 204f, which may be located at the interior of the mobile entity 200, may be more suitable to provide communication with communication devices that are located within the mobile entity 200 due to less obstruction configuration, orientation, position and so on. In this regard, the central processor 206 may be operable to control which one or more of the plurality of distributed transceivers 204a, 204b, 204c, 204d, 204e, 204f, . . . 204n may be utilized to provide communication with the satellite network 110, the WWAN 112 and/or the WLAN 114, communication devices 122 and/or other mobile entities.

In various exemplary embodiments of the invention, the distributed transceivers 204a, 204b, 204c may be located at the uppermost portion of the mobile entity 200. Accordingly, the distributed transceivers 204a, 204b, 204c may be more suitable for communication with the satellite network 110, the WWAN 112 and/or the WLAN 114. The distributed transceiver 204n may be located at a forward position of the mobile entity 200 and the distributed transceiver 204d may be located at the rearward position of the mobile entity 200. Accordingly, the distributed transceivers 204d, 204n may be more suitable to provide communication with other mobile entities that may be towards the front or rear of the mobile entity, respectively. In this regard, the distributed transceiver 204d, 204n may be more suitable for handling repeating and/or relaying functionalities for other mobile entities while the mobile entity 200 may be in motion. The distributed transceivers 204e, 204f, which may be located inside mobile entity 200 may be best suited for providing communication within the mobile entity 200. In instances where one or more of the distributed transceivers 204e, 204f, which may be located within the mobile entity 200 may also be capable of providing communication with devices that may be external to the mobile entity 200, the central processor 206 may be operable to configure one or both of the distributed transceivers 204e, 204f, accordingly. In some embodiments of the invention, the NME 208 identifies whether a mobile device is located inside the mobile entity 200 (using positioning techniques based on signal strength, angle of arrival, etc or using any other sensors within 200). In such cases, the NME configures the network configuration such that a transceiver unit (e.g., 204f) facing the 200's interior is used and enabled to provide connection to that mobile device.

Each of the plurality of antenna arrays 205a, 205b, 205c, 205d, 205e, 205f, . . . , 205n in the plurality of distributed transceivers 204a, 204b, 204c, 204d, 204e, 204f, . . . , 204n, respectively, may comprise suitable logic, circuitry, interfaces and/or code that may be operable to handle communication of wireless signals. For example, each of the plurality of antenna arrays 205a, 205b, 205c, 205d, 205e, 205f, . . . , 205n in the plurality of distributed transceivers 204a, 204b, 204c, 204d, 204e, 204f, . . . , 204n may be operable to transmit and/or receive wireless signals corresponding to the WPAN, WLAN, WMAN, WWAN and/or mmWave technologies, standards and/or protocols.

One or more of the plurality of antenna arrays 205a, 205b, 205c, 205d, 205e, 205f, . . . , 205n may be operable to receive satellite signals from the satellites 110a, . . . 110n in the satellite network 110.

One or more of the plurality of distributed transceivers 204a, 204b, 204c, 204d, 204e, 204f, . . . 204n may be communicatively coupled to one or more central processors such as the central processor 206 via one or more communication links. In this regard, one or more of the plurality of distributed transceivers 204a, 204b, 204c, 204d, 204e, 204f, . . . 204n may be communicatively coupled to the central processor 206 via a wired communication link, a wireless communication link, an optical communication link and/or another type of communication link such as a hybrid fiber coaxial communication link. Alternatively, a digital link (e.g., Ethernet) may be used between the transceivers and the central processor 206 if the transceivers 204a, 204b, 204c, 204d, 204e, 204f, . . . 204n include analog-to-digital and digital-to-analog conversion functions. One or more of the plurality of distributed transceivers 204a, 204b, 204c, 204d, 204e, 204f, . . . 204n may be operable to support a set of carrier frequencies, for example, 2 GHz, 5 GHz, 60 GHz, and so on and/or one or more of the plurality of distributed transceivers 204a, 204b, 204c, 204d, 204e, 204f, . . . 204n may be operable to support specific carrier frequencies, which may be dedicated to certain frequencies.

The central processor 206 in the mobile entity 200 may comprise suitable logic, circuitry, interfaces and/or code that may be operable to control and/or manage operation of the plurality of distributed transceivers 204a, 204b, 204c, 204d, 204e, 204f, . . . , 204n and/or corresponding plurality of antenna arrays 205a, 205b, 205c, 205d, 205e, 205f, . . . , 205n in the mobile entity 200. In this regard, the central processor 206 may be operable to configure and/or manage the communication links that are handled by the mobile entity 200. The central processor 206 may also be operable to monitor and/or collect information from each of the plurality of distributed transceivers 204a, 204b, 204c, 204d, 204e, 204f, . . . , 204n and communicate data associated with the monitoring and/or collecting to the network management engine 208. The network management engine 208 may be operable to utilize the resulting communicated data to configure the operation of one or more of the plurality of distributed transceivers 204a, 204b, 204c, 204d, 204e, 204f, . . . , 204n and/or corresponding plurality of antenna arrays 205a, 205b, 205c, 205d, 205e, 205f, . . . , 205n.

The optional network management engine 208 may comprise suitable logic, circuitry, interfaces and/or code that may be operable to manage communication resources within the mobile entity 200 and/or other devices that may be communicatively coupled to one or more of the distributed transceivers 204a, 204b, 204c, 204d, 204e, 204f, . . . , 204n. The network management engine 208 may be operable to communicate with the central processor 206 in the mobile entity 200 in order to manage and communication resources within the mobile entity 200 and/or other devices, which may be communicatively coupled to one or more of the distributed transceivers 204a, 204b, 204c, 204d, 204e, 204f, . . . , 204n. In some embodiments of the invention, the NME unit 208 may physically reside in a remote device or server, and be implemented in hardware, software, or a combination.

United States application Ser. No. 13/919,922, which was filed on Jun. 17, 2013, discloses . . . additional details of a central processor and a network management ending and is hereby incorporated herein by reference in its entirety.

Figure 3:
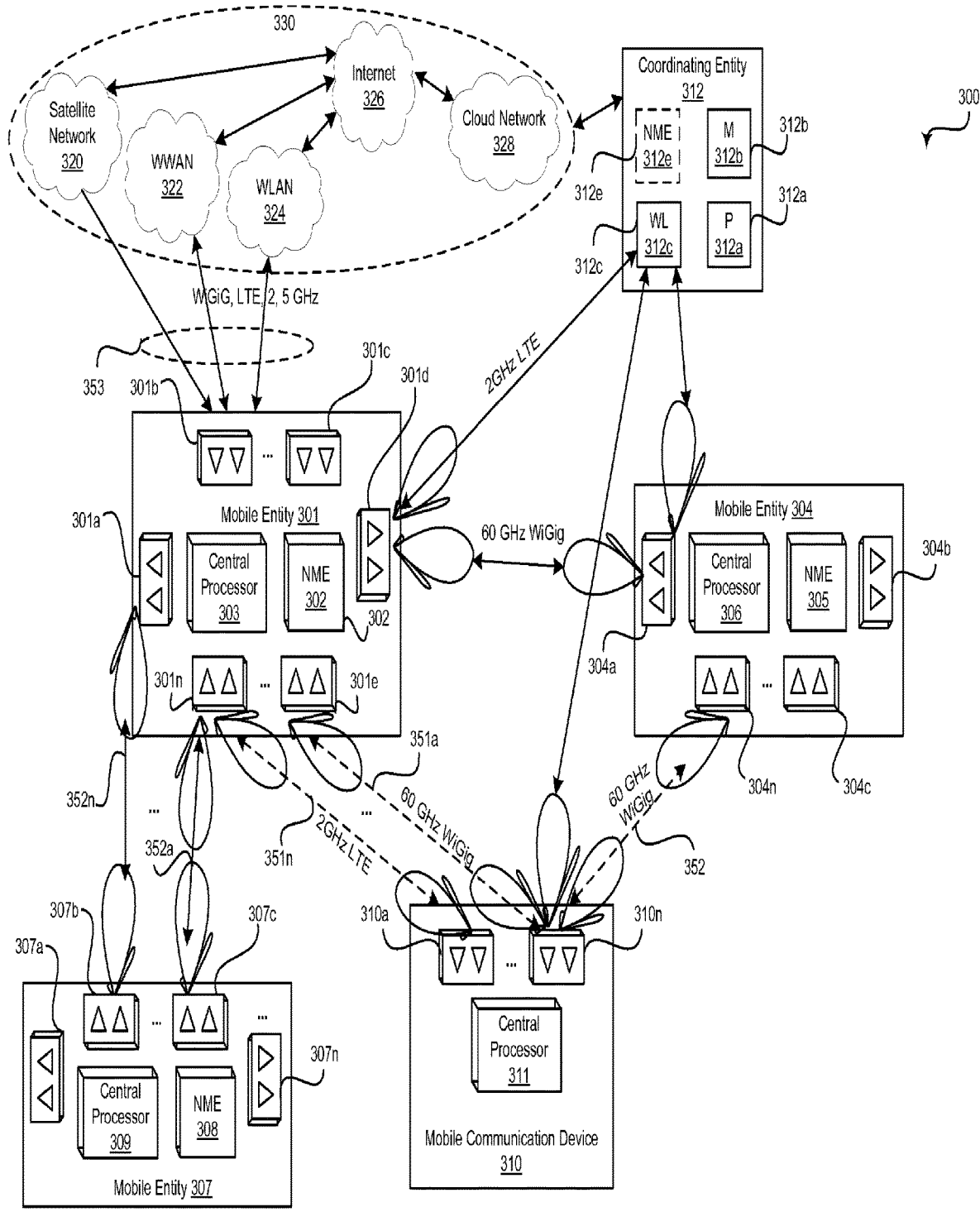
FIG. 3 is a block diagram illustrating exemplary communication utilizing a plurality of distributed transceivers in a mobile entity, in accordance with an exemplary embodiment of the invention.

FIG. 3 is a block diagram illustrating exemplary communication utilizing a plurality of distributed transceivers in a mobile entity, in accordance with an exemplary embodiment of the invention. Referring to FIG. 3, there are shown network 300, which comprises a plurality of mobile entities 301, 304, 307, a mobile communication device 310, a coordinating entity 312 and a plurality of communication networks that are collectively referenced as 330. The plurality of communication networks 330 may comprise a satellite network 320, a WWAN 322, a WLAN 324, the Internet 326 and a cloud network 328. FIG. 3 also illustrates exemplary wireless communication links 351a, ..., 351n, links 352a, ..., 352n, and communication links 353.

Each of the mobile entities 301, 304, 307 may comprise, for example, an automobile such as a car, a truck, an omnibus (bus), a trailer, a mobile home train, a forklift, construction equipment, an aircraft or any other type of vehicle. Each of the mobile entities 301, 304, 307 may comprise a plurality of distributed transceivers, a central processor and a network management engine. In this regard, the mobile entity 301 comprises a plurality of distributed transceivers 301a, 301b, 301c, 301d, 301e, ..., 301n, a network management engine 302 and a central processor 303. The mobile entity 304 comprises a plurality of distributed transceivers 304a, 304b, 304c, ..., 304n, a network management engine 305 and a central processor 306. The mobile entity 307 comprises a plurality of distributed transceivers 307a, 307b, 307c, ..., 307n, a network management engine 308 and a central processor 309.

The mobile entity 301 and the plurality of distributed transceivers 301a, 301b, 301c, 301d, 301e, ..., 301n may be substantially similar to the mobile entity 200 and the plurality of distributed transceivers 204a, 204b, 204c, 204d, 204e, 204f, ..., 204n, which are shown and described with respect to FIG. 2, for example. One or more of the plurality of distributed transceivers 301a, 301b, 301c, 301d, 301e, ..., 301n in the mobile entity 301 may be operable to communicate or relay content among one or more of the communication networks 300, the mobile entity 307 and/or the mobile communication device 310. The mobile entity 304 and the plurality of distributed transceivers 304a, 304b, 304c, ..., 304n may be substantially similar to the mobile entity 200 and the plurality of distributed transceivers 204a, 204b, 204c, 204d, 204e, 204f, ..., 204n, which are shown and described with respect to FIG. 2, for example. One or more of the plurality of distributed transceivers 304a, 304b, 304c, ..., 304n in the mobile entity 304 may be operable to communicate or relay content among one or more of the communication networks 300, the mobile entity 301 and/or the mobile communication device 310. The mobile entity 307 and the plurality of distributed transceivers 307a, 307b, 307c, ..., 307n may be substantially similar to the mobile entity 200 and the plurality of distributed transceivers 204a, 204b, 204c, 204d, 204e, 204f, ..., 204n, which are shown and described with respect to FIG. 2, for example. One or more of the plurality of distributed transceivers 307a, 307b, 307c, ..., 307n in the mobile entity 307 may be operable to communicate or relay content among one or more of the communication networks 300 the mobile entities 301, 304 and/or the mobile communication device 310.

Each of the central processors 303, 306, 309 in the mobile entities 301, 304, 307, respectively, may comprise suitable logic, circuitry, interfaces and/or code that may be operable to control and/or manage operation of the plurality of distributed transceivers in the mobile entities 301, 304, 307, respectively. In this regard, the central processors 303, 306, 309 in the mobile entities 301, 304, 307 may be operable to control and/or manage operation of the plurality of distributed transceivers 301a, 301b, 301c, 301d, 301e, ..., 301n, 304a, 304b, 304c, ..., 304n, 307a, 307b, 307c, ..., 307n, respectively. Each of the central processors 303, 306, 309 may be operable to configure and/or manage the communication links that are handled by the mobile entities 301, 304, 307, respectively. Each of the central processors 303, 306, 309 may be operable to monitor and/or collect information from each of the plurality of distributed transceivers 301a, 301b, 301c, 301d, 301e, ..., 301n, 304a, 304b, 304c, ..., 304n, 307a, 307b, 307c, ..., 307n, respectively, and communicate data associated with the monitoring and/or collecting to one or more of the network management engines 302, 305, 308. One or more of the network management engines 302, 305, 308 may be operable to utilize the resulting communicated data to configure the operation of one or more of the plurality of distributed transceivers 301a, 301b, 301c, 301d, 301e, ..., 301n, 304a, 304b, 304c, ..., 304n, 307a, 307b, 307c, ..., 307n and/or their corresponding plurality of antenna arrays. Each of the central processors 303, 306, 309 in the mobile entities 301, 304, 307, respectively, may be substantially similar to the central processor 206, which is shown and described with respect to FIG. 2, for example.

Each of the network management engines 302, 305, 308, which may be located in the mobile entities 301, 304, 307, respectively, may be operable to configure the corresponding distributed transceivers within the corresponding mobile entity. In this regard, for example, the network management engines 302, 305, 308 may be operable to determine which one or more of the distributed transceivers may be activated and/or deactivated, and/or the carrier frequency and/or frequencies, beam patterns, modulations, security, power that may be utilized by one or more of the distributed transceivers. Although the network management engines 302, 305, 308 are illustrated as being located in the mobile entities 301, 304, 307, respectively, the invention is not limited in this regard. Accordingly, the network management engines 302, 305, 308 may logically or physically reside as separate components or devices, and/or may be located within other components or devices within the network 300. For example, network management engines such as the network management engines 302, 305, 308 may be located in and/or within devices within the WWAN 322, the WLAN 324, the Internet 326 and/or the cloud network 328. For example, network management engines such as the network management engines 302, 305, 308 may be located in the base stations 112a, 112b, ..., 112n, of the WWAN 114, which are shown and described with respect to FIG. 1. In another example, network management engines such as the network management engines 302, 305, 308 may be located in the access points 114a, 114b, ..., 114n, of the WLAN 114, which are shown and described with respect to FIG. 1, for example. In some embodiments of the invention, network management engines 302, 305, 308 may be coordinated, managed, arbitrated, and/or overridden by the coordinating entity 312.

The network management engines such as the network management engines 302, 305, 308, which may be located in the mobile entities 301, 304, 307, respectively, may be operable to utilize different types of data to configure the settings and/or operation of one or more of the distributed transceivers. Exemplary types of data may comprise the global navigational satellite system (GNSS) location of the mobile entity, the speed of the mobile entity, and motion sensor data. The network management engines such as the network management engines 302, 305, 308, may be operable to utilize the different types of data to predict the trajectory and/or orientation of the corresponding mobile entity and the resulting predicted information may be utilized to adjust one or more of the settings and/or configurations for one or more of the distributed transceivers in the network 300. The adjustment of one or more of the settings and/or configurations for one or more of the distributed transceivers in the network 300 may be done in advance to guarantee a good link performance.

Exemplary GNSS data may comprise data from global positioning system (GPS), Galileo and/or GLONASS. Exemplary speed data may be derived from GNSS and/or speedometer and so on. Exemplary motion sensor data may be derived from accelerometers and/or gyroscopes and so on. In some embodiments of the invention where non-stationary satellite orbits may be utilized, the moving locations and known speed vectors of satellites may be utilized to predict the relative trajectories of satellites and the mobile entities and adjust the beam patterns utilized by one or more of the distributed transceivers in the network 300 in advance.

In some embodiments of the invention, the network management engine within a mobile entity and/or the coordinating entity 312 may be operable to effect changes in the carrier frequency that is being utilized by one or more of the distributed transceivers. In this regard, for example, the network management engine 302 in the mobile entity 301 and/or the coordinating entity 312 may be operable to cause a change in the carrier frequency that is being utilized by one or more of the distributed transceivers to handle communication links with the satellite network 320 based on current or predicted weather conditions. For example, a switch may be made to utilize one or more better carrier frequencies based on humidity, rain, temperature, pressure, environmental emergency, and so on.

In some embodiments of the invention, a set of distributed transceivers within a mobile entity may be linked to concurrently handle multiple available satellites. For example, the distributed transceivers 301a, 301b, 301c, 301d in the mobile entity 301 may be linked to concurrently handle traffic from a plurality of satellites in the satellite network 320. The concurrent communication links may be utilized to transport different data streams to provide a higher throughput and/or to transport the same data stream in order to provide diversity, reliability and link margin.

In some embodiments of the invention, when acting as a relay node, the mobile entities 301, 304, 307 may be operable to configure different ones of their corresponding distributed transceivers and/or utilize different configurations for handling external communication links. For example, the mobile entity may be operable to utilize a first set of distributed transceivers and/or frequencies to receive data on the downlink from the satellite network 320 while utilizing the first set of distributed transceivers and/or frequencies for transmitting data on the uplink to one or more base stations in the WWAN 322. In some embodiments of the invention, the network management engine 302 and/or the coordinating entity 312 may determine that different connection types may be utilized for handling the corresponding downlink. In this regard, the network management engine 302 and/or the coordinating entity 312 may determine that one or more communication links may be established with the satellite network 320 and utilized to download content from the Internet 326. Depending on the location of the mobile entity 301 and/or propagation conditions, in order to download the content from the Internet 326, the network management entity 302 may determine that one or more of the communication links that are currently being utilized by the mobile entity 301 may need to be switched in order to utilize one or more different distributed transceivers to connect to one or more base stations in the WWAN 322 and/or one or more access points in the WLAN 324. The switching of the downlink connection between the satellite network 320, the WWAN 322, and/or the WLAN 324 may occur dynamically and may be based on, for example, channel conditions, coverage, throughput demand, QoS, CoS. A subset of embodiments in U.S. application Ser. No. 13/473,093, filed May 16, 2012, entitled "METHOD AND SYSTEM FOR A REPEATER NETWORK THAT UTILIZES DISTRIBUTED TRANSCEIVERS WITH ARRAY PROCESSING," which is incorporated herein by reference in its entirety, may be applicable to this scenario.

In various embodiments of the invention, one or more of the distributed transceivers in one or more of the mobile entities 301, 304, 307 may be operable to sense the environment in which they operate. For example, one or more of the distributed transceivers 301a, 301b, 301c, 301d, 301e, ..., 301n, 304a, 304b, 304c, ..., 304n, 307a, 307b, 307c, ..., 307n may be operable to sense the environment in order to determine devices and/or objects in the environment, which may be utilized to establish or improve the link quality between mobile entities, mobile communication devices and/or network devices such as access points. These devices and/or objects in the environment may be planted in the environment for the purpose of network improvement and/or may be existing objects in the environment such as fixtures. These devices and/or objects in the environment may have different RF reflection and refraction and/or diffraction properties and may be utilized differently by one or more of the distributed transceivers to improve and/or optimize communication. Some devices and/or objects in the environment may possess good reflective properties with low reflection loss and/or refraction/diffraction and other devices and/or objects in the environment may possess good and/or controlled refraction and/or diffraction properties. The resulting information from the sensing may be communicated from one or more of the distributed transceivers 301a, 301b, 301c, 301d, 301e, ..., 301n, 304a, 304b, 304c, ..., 304n, 307a, 307b, 307c, ..., 307n to the network management engine 302 and/or the coordinating entity 312, which may be operable to analyze the corresponding information and determine appropriate configuration for one or more of the distributed transceivers 301a, 301b, 301c, 301d, 301e, ..., 301n, 304a, 304b, 304c, ..., 304n, 307a, 307b, 307c, ..., 307n and/or their corresponding antenna arrays.

In accordance with various embodiments of the invention, the network management engine 302 and/or the coordinating entity 312 may be operable to manage the combination of distributed transceiver resources within the mobile entity 301 in order to, for example, maximize and/or optimize the performance of the corresponding wireless communication links 351a, ..., 351n, communication links 352a, ..., 352n, and communication links 353. In accordance with various embodiments of the invention, the network management engine 302 and/or the coordinating entity 312 may be operable to coordinate operation of the plurality of distributed transceivers 301a, 301b, 301c, 301d, 301e, ..., 301n in the mobile entity 301, to provide, for example, spatial multiplexing, spatial diversity, frequency diversity, and/or multiple input multiple output (MIMO) processing. In this regard, the network management engine 302 and/or the coordinating entity 312 may be operable to combine or aggregate the distributed transceiver resources in the mobile entity 301 in order to program or configure the resulting pooled distributed transceiver resources to provide better performance over the communication links 351a, ..., 351n, communication links 352a, ..., 352n, and communication links 353. The network management engine 302 and/or the coordinating entity 312 may be operable to program or configure the resulting pooled distributed transceiver resources to provide different levels of coordination based on system restrictions and/or capabilities and/or based on channel characteristics, QoS, CoS, traffic type and so on. The network management engine 302 and/or the coordinating entity 312 may be operable to manage the combination of distributed transceiver resources within the mobile entities 304, 307 in a similar manner.

In some embodiments of the invention, the coordinating entity 312 may adopt a cost function as the criterion for configuration and optimization of the network. The coordinating entity 312 may then attempt to configure the entities in 300 (including all distributed transceivers) to optimize that cost function (minimize or maximize depending on the nature of the function). For example, one such cost function may be the total network capacity, i.e., combined/aggregated throughputs delivered to all end mobile devices. Another exemplary cost function may be the aggregated capacity delivered to a subset of end mobile devices (e.g., premium users). Another exemplary cost function may be the spectral efficiency achieved over licensed spectrums (to exclude unlicensed bands such as 2.4/5 GHz ISM bands). Yet another exemplary cost function may be a combination of projected battery lives of end users (i.e., their current consumption). Another cost function may be a combination of latency, diversity order, and reliability for a subset of users. Another exemplary cost function may be the worst throughput in the network (i.e., maximizing the minimum throughput). Another exemplary cost function may be the number of end users achieving a capacity/throughput above a programmable threshold. Yet another exemplary cost function may be a weighted combination of the above example functions. Furthermore, the coordinating entity 312 may dynamically and/or adaptively switch between different cost functions (optimization policies) based on parameters such as the number of active/connected devices, time of day, geographical location, time-dependent spectrum licenses, etc.

U.S. application Ser. No. 13/473,160, which was filed May 16, 2012 discloses a method and system for providing diversity in a network of distributed transceivers with array processing and is hereby incorporated herein by reference in its entirely.

U.S. application Ser. No. 13/473,180, which was filed May 16, 2012 discloses a method and system that utilizes multiplexing in a network of distributed transceivers with array processing and is hereby incorporated herein by reference in its entirely.

U.S. application Ser. No. 13/473,113, which was filed May 16, 2012 discloses a method and system that utilizes MIMO communication in a network of distributed transceivers with array processing and is hereby incorporated herein by reference in its entirely.

The mobile communication device 310 may comprise suitable logic, circuitry, interfaces and/or code that may be operable to communicate with one or more of the distributed transceivers in the mobile entities. In this regard, the mobile communication device 310 may be operable to communicate with one or more of the distributed transceivers 301a, 301b, 301c, 301d, 301e, 301f, . . . , 301n, 304a, 304b, 304c, . . . , 304n, 307a, 307b, 307c, . . . , 307n, which are located within the mobile entities 301, 304, 307, respectively. The mobile communication device 310 may be operable to communicate utilizing, for example, WWAN, WMAN, WLAN, WPAN and/or mmWave technologies, standards and/or protocols. Exemplary, WWAN technologies, standards and/or protocols may comprise 3G, 4G, LTE, and/or WiMax. Exemplary WLAN technologies, standards and/or protocols may comprise an IEEE 802.11 based standard such as 802.11 a/b/g/n/ac/p/q and/or variants thereof. Exemplary mmWave technologies, standards and/or protocols may comprise 60 GHz wireless standard, IEEE 802.11ad, WirelessHD and/or WiGig.

The central processor 311 in the mobile communication device 310 may comprise suitable logic, circuitry, interfaces and/or code that may be operable to control and/or manage operation of the plurality of distributed transceivers in the mobile communication device 310. In this regard, the central processor 311 may be operable to control and/or manage operation of the plurality of distributed transceivers 310a, . . . , 310n, respectively. The central processor 311 may be operable to configure and/or manage the communication links that are handled by the mobile communication device 310. In this regard, the central processor 311 may be operable to monitor and/or collect information from each of the plurality of distributed transceivers 310a, . . . , 310n, respectively, and may communicate data associated with the monitoring and/or collecting to one or more of the network management engines 302, 305 and/or the coordinating entity 312, to which the mobile communication device 310 may be communicatively coupled. One or more of the network management engines 302, 305 and/or the coordinating entity 312 may be operable to utilize the resulting communicated data to configure the operation of one or more of the plurality of distributed transceivers 301a, 301b, 301c, 301d, 301e, . . . , 301n, 304a, 304b, 304c, . . . , 304n and/or their corresponding plurality of antenna arrays. The central processor 311 in the mobile communication device 310 may be substantially similar to the central processor 206, which is shown and described with respect to FIG. 2, for example.

The coordinating entity 312, which may be optional, may comprise suitable logic, circuitry, interfaces and/or code that may be operable to control, coordinate and/or manage the handling and routing of traffic and/or control data within the communication network 300. The coordinating entity 312 may be operable to control the type and/or amount of links, the number of distributed transceivers, configuration of the distributed transceivers' interfaces and/or components including RF front ends and/or antenna arrays, which may be utilized by one or more of the distributed transceivers to handle traffic for one or more of the mobile entities 301, 304, 307 and/or the mobile communication device 310. The coordinating entity 312 may be operable to control the allocation and de-allocation of bandwidth to facilitate communication of traffic in order to provide and/or guarantee a particular class of service (CoS) and/or Quality of Service (QoS) for the mobile entities 301, 304, 307 and/or the mobile communication device 310. The coordinating entity 312 may also be operable to coordinate amongst the various access devices in the WWAN 322 and/or the WLAN 324 and the network management engines and/or the central processors in the mobile entities and/or mobile communication devices in order to route traffic within the communication network 300 Although the coordinating entity 312 is illustrated as a separate entity within the network 300, the invention is not limited in this regard. Accordingly, the coordinating entity 312 may logically or physically reside as separate components or devices and/or located within other components or devices within the network 300. For example, the coordinating entity 312 may be located in and/or within devices within the WWAN 322, the WLAN 324, the Internet 326 and/or the cloud network 328. For example, the coordinating entity 312 may be located in the base stations 112a, 112b, . . . , 112n, of the WWAN 112, which are shown and described with respect to FIG. 1. In another example, the coordinating entity 312 may be located in the access points 114a, 114b, . . . , 114n, of the WLAN 114, which are shown and described with respect to FIG. 1. In some embodiments of the invention, the functionality of the coordinating entity 312 may be split amongst a plurality of devices within the network 300.

The satellite network 320 may be operable to convey content to a plurality of receiving devices via one or more satellites. In this regard, satellites in the satellite network 320 may be operable to broadcast content, which may received by one or more of the mobile entities 301, 304, 307. One or more of the mobile entities 301, 304, 307 may be operable to process and/or communicate the received content to others of the mobile entities 301, 304, 307 and/or the mobile communication device 310. The satellite network 320 may be substantially similar to the satellite network 110, which is shown and described with respect to FIG. 1, for example.

The WWAN 322 may comprise suitable logic, interfaces and/or devices that may be operable to provide wide area wireless connectivity. In this regard, the wireless wide area network 322 may enable communication via one or more WWAN based standards and/or protocols such as 3G, 4G, LTE and WiMax. Content from one or more of the Internet 326, the cloud network 328, the WWAN 322 and/or the WLAN 324 may be wirelessly communicated among one or more of the mobile entities 301, 304, 307 and/or the mobile communication device 310. The WWAN 322 may be substantially similar to the WWAN 112, which is shown and described with respect to FIG. 1.

The WLAN 324 may comprise suitable logic, interfaces and/or devices that may be operable to provide local area wireless connectivity. In this regard, the WLAN 324 may enable communication via IEEE 802.11 based standards and/or protocols such as 802.11 a/b/g/n/ac/p/q and/or variants thereof. The WLAN 324 may be substantially similar to the wireless local area network 114, which is shown and described with respect to FIG. 1, for example.

The Internet 326 may comprise suitable devices and/or interfaces that enable the interconnection of a plurality of networks and/or devices. In this regard, the Internet 116 may enable the interconnection of, for example, the satellite network 320, the WWAN 322, the WLAN 324, and/or the cloud network 328. The Internet 326 may host a plurality of resources and provide a plurality of Internet-based services. The Internet 326 may be substantially similar to the Internet 116, which is shown and described with respect to FIG. 1, for example.

The cloud network 328 may comprise suitable devices and/or interfaces that is operable to provide one or more services to, for example, the satellite network 320, the WWAN 322, the WLAN 324, the mobile entities 301, 304, 307 and/or to the mobile communication device 310. In this regard, the cloud network 328 may, for example, provide storage of information, hosting of information and/or other cloud based services for the satellite network 320, the WWAN 322, the WLAN 324, mobile entities 301, 304, 307 and/or the mobile communication device 310 via the Internet 326. The cloud network 328 may be communicatively coupled to the Internet 326 via the communication link. The cloud network 328 may be substantially similar to the cloud network 118, which is shown and described with respect to FIG. 1, for example.

One or more of the plurality of distributed transceivers which may be internal and/or external to a mobile entity may be configured to operating in, for example, a relay mode. In an exemplary embodiment of the invention, one or more of the plurality of distributed transceivers 301a, 301b, 301c, 301d, 301e, . . . , 301n may be communicatively coupled to the WWAN 322 and one or more remaining ones of the plurality of distributed transceivers 301a, 301b, 301c, 301d, 301e, . . . , 301n may be communicatively coupled to one or more of the plurality of distributed transceivers 307a, 307b, 307c, . . . , 307n in the mobile entity 307. For example, the distributed transceivers 301b, 301c in the mobile entity 301 may be communicatively coupled to the WWAN 322 and distributed transceivers 301e, 301n in the mobile entity 301 may be communicatively coupled to the distributed transceivers 307b, 301c in the mobile entity 307. In this regard, the distributed transceivers 301b, 301c in the mobile entity 301 may receive content from the cloud network 328 via the WWAN 322 and the distributed transceivers 301e, 301n in the mobile entity 301 may be operable to relay the content to the distributed transceivers 307b, 307c in the mobile entity 307. In this regard, the central processors 303, 309 and/or the network management engines 302, 308 in the mobile entities 301, 307, respectively, may be operable to coordinate the relay operation including the carrier frequency and/or frequencies, beam patterns, modulations, security, and/or power levels that may be utilized by one or more of the distributed transceivers 301b, 301c, 301e, 301n, 307b, 307c.

In another example, the distributed transceivers 301b, 301c in the mobile entity 301 may be communicatively coupled to the WLAN 324 and distributed transceivers 301d in the mobile entity 301 may be communicatively coupled to the distributed transceivers 304a in the mobile entity 304. In this regard, the distributed transceivers 301b, 301c in the mobile entity 301 may receive content from the Internet 326 via the WLAN 324 and the distributed transceivers 301d in the mobile entity 301 may be operable to relay the content to the distributed transceivers 304a in the mobile entity 307. In this regard, the central processors 303, 306 and/or the network management engines 302, 305 in the mobile entities 301, 304, respectively may be operable to coordinate the relay operation including the carrier frequency and/or frequencies, beam patterns, modulations, security, and/or power levels that may be utilized by one or more of the distributed transceivers 301b, 301c, 301d, 304a. In this regard, in instances where the mobile entity 301 may be located outside a home having the WLAN 324, the mobile entity 301 may be operable to function as a relay node between the access points that may be within WLAN 324 and the mobile entity 304.

In another example, the distributed transceivers 301b, 301c in the mobile entity 301 may be communicatively coupled to the WWAN 322 and distributed transceivers 301e, 301n in the mobile entity 301 may be communicatively coupled to the distributed transceivers 310a, 310n in the mobile communication device 310. In this regard, the distributed transceivers 301b, 301c in the mobile entity 301 may receive content from the Internet 326 via the WWAN 322 and the distributed transceivers 301e, 301n in the mobile entity 301 may be operable to relay the content to the distributed transceivers 310a, 310n in the mobile communication device 310. In this regard, the central processors 303, 311 and/or the network management engine 302 in the mobile entities 301, 310 respectively, may be operable to coordinate the relay operation including the carrier frequency and/or frequencies, beam patterns, modulations, security, and/or power levels that may be utilized by one or more of the distributed transceivers 301b, 301c, 301e, 301n, 310a, 310n.

In accordance with various embodiment of the invention, the mobile entities 301, 304, 307 may be operable to utilize different carrier frequencies, modulations, constellations, encoding and/or protocols for one or more connections to the base stations in the WWAN 322, to the access points in the WLAN 324, to the mobile device 310. For example, the communication links coupling the mobile entity 301 and one or more base stations in the WWAN 322 and/or one or more access points in the WLAN 324 may utilize 2 GHz, 5 GHz or 60 GHz carrier frequencies, as well as WLAN or LTE protocols. Similarly, the communication links coupling the one or more of the mobile entities 301, 304, 307 to the mobile communication device 310 may utilize 2 GHz, 5 GHz or 60 GHz carrier frequencies and/or may reuse the same frequency as the one used to communicate with one or more base stations in the WWAN 322. Wireless personal area network (WPAN) such as Bluetooth and ZigBee and/or WLAN protocols may also be utilized.

In accordance with various embodiments of the invention, usage of one or more of the distributed transceivers in a mobile entity may be shared. For example, in instances where the mobile entity 301 may be a privately owned automobile, communication links to one or more of the transceivers within the mobile entity 301 may be limited to a list of mobile communication devices that are owned and/or authorized by the owner of the mobile entity 301. In instances where the mobile entity 301 may be a publicly owned automobile, such as a taxi or a bus, communication links to one or more of the transceivers within the mobile entity 301 may be limited to authorized users of the bus or may be opened to the general public. In instances where the mobile entity 301 may be a privately owned automobile, the owner of the mobile entity 301 may receive incentives from the WWAN carriers to allow the network management engine 302 and/or the coordinating entity 312 to utilize one or more of the distributed transceivers in the mobile entity 301 to provide communication to other users or customers of the WWAN carrier in instances when they may be within operating range of the mobile entity 301. Exemplary incentives may comprise a bill credit, bill discount, higher data cap, higher data rate, reciprocal subscriber usage, cash rebate, and so on.

In some embodiments of the invention, the network management engines 302, 305, 308 and/or the coordinating entity 312 may be operable to configure one or more distributed transceivers in a mobile entity to backhaul traffic to one or more of the communication networks 330. For example, the coordinating entity 312 and/or the network management engine 2d transceivers 301b, 301c in a mobile entity 301 to backhaul traffic to the WWAN 322. In this regard, the coordinating entity 312 and/or the network management engine 302 may be operable to coordinate the resources for the distributed transceivers 301b, 301c to provide a high bandwidth backhaul communication link to the WWAN 322. The high bandwidth backhaul communication link to the WWAN 322 may be established whenever it may be needed and its resources may be reallocated whenever there is no longer a need for the high bandwidth backhaul communication link to the WWAN 322. In various embodiments of the invention, backhaul communication links may be established between a plurality of mobile entities having sufficient available bandwidth in order to convey traffic from, for example, a mobile communication device such as the mobile communication device 310 to one or more of the communication networks 330

In some embodiments of the invention, the network management entity 302 and/or the coordinating entity 312 may be operable to establish a backhaul communication link to the WWAN 322 as a virtual private network in order to provide security, privacy and/or anonymity.

In some embodiments of the invention, the network management entity 302 and/or the coordinating entity 312 may be operable to assign different traffic types and/or classes to different types of communication links being handled by the distributed transceivers 301a, 301b, 301c, 301d, 301e, ..., 301n. For example, at least a portion of the communication of control data and/or settings between the mobile entity 301 and the networks 300 may be transported through one or more base stations in the WWAN 322 because of its higher reliability of, for example, the LTE or WWAN communication link, while high throughput streaming traffic may be transported over satellite communication links between the satellite network 320 and one or more of the distributed transceivers 301a, 301b, 301c, 301d, 301e, ..., 301n in the mobile entity 301.

In some embodiments of the invention, the network management engines 302, 305, 308 and/or the coordinating entity 312 may be operable to co-optimize the network configurations for the mobile entities 301, 304, 307, respectively. In this regard, the mobile entities 301, 304, 307 may function as, for example, distributed access points and/or network nodes that may be operable to provide high throughput links to a group of mobile communication devices such as the mobile communication device 310. The distributed access points and/or network nodes provided by the mobile entities 301, 304, 307 may operate in a manner that may be substantially similar to the access points and distributed transceivers, which are illustrated and described with respect to FIG. 1, for example.

In some embodiments of the invention, a mobile entity such as the mobile entity 301, with distributed transceivers 301a, 301b, 201c, 301d, 301e, ..., 301n may be utilized to provide high-speed broadband wireless connectivity to fixed devices such as access points and/or routers. For example, when the mobile entity 301 and/or mobile entity 304 may be close to a house and/or an office, the mobile entities 301, 304 may be utilized as a relay node to provide connection to the routers and/or gateways within the home and/or the office. In this regard, the router and/or gateway in the home and/or office may connect to the Internet either through existing wire-line connections such as cable modem, DSL, dial up, or the wireless connection provided by one or both of the mobile entities 301, 304. This multi-mode router and/or gateway may use the two connection types (wired and/or wireless) exclusively or concurrently based on parameters such as time of day, availability of mobile entities, peak throughout demand, achievable throughput through DSL/cable-modem, congestion in any of networks, and time-based billing policies.

In some embodiments of the invention, a mobile entity such as the mobile entity 301 may be operable to share its position and/or speed data. In this regard, the mobile entity 301, which may be functioning as a relay, may be operable to provide connectivity to one or more mobile communication devices and may communicate or otherwise share its position and/or speed data to those mobile communication devices. The mobile communication devices may then utilize the position and/or speed data from the mobile entity to improve their overall positioning accuracy and/or to switch off their internal positioning methods such as GNSS to conserve battery power. Exemplary position and/or speed data may be derived from GNSS, speedometer, motion sensing devices and/or other positioning devices and/or techniques in the mobile entity 301.

Figure 4:
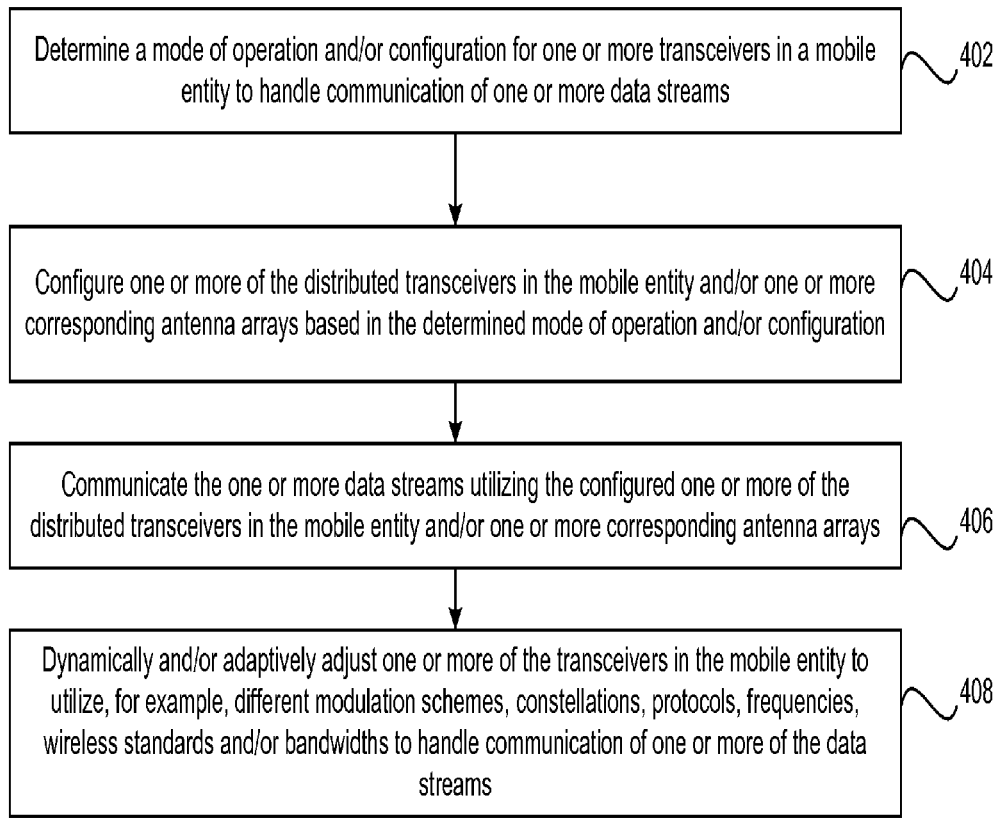
FIG. 4 is a flow chart illustrating exemplary steps for communicating utilizing distributed transceivers in a mobile entity, in accordance with an exemplary embodiment of the invention.

FIG. 4 is a flow chart illustrating exemplary steps for communicating utilizing distributed transceivers in a mobile entity, in accordance with an exemplary embodiment of the invention. Referring to FIG. 4, there are shown exemplary steps 402 through 408. In step 402, a mode of operation and/or configuration for one or more transceivers in a mobile entity to handle communication of one or more data streams may be determined. In step 404, one or more of the distributed transceivers in the mobile entity and/or one or more corresponding antenna arrays may be configured based on the determined mode of operation and/or configuration. In step 406, the one or more data streams may be communicated utilizing the configured one or more of the distributed transceivers in the mobile entity and/or the one or more corresponding antenna arrays. In step 408, one or more of the transceivers may be dynamically and/or adaptively adjusted in the mobile entity to utilize, for example, different modulation schemes, constellations, protocols, frequencies, wireless standards and/or bandwidths to handle communication of one or more of the data streams.

Figure 5:
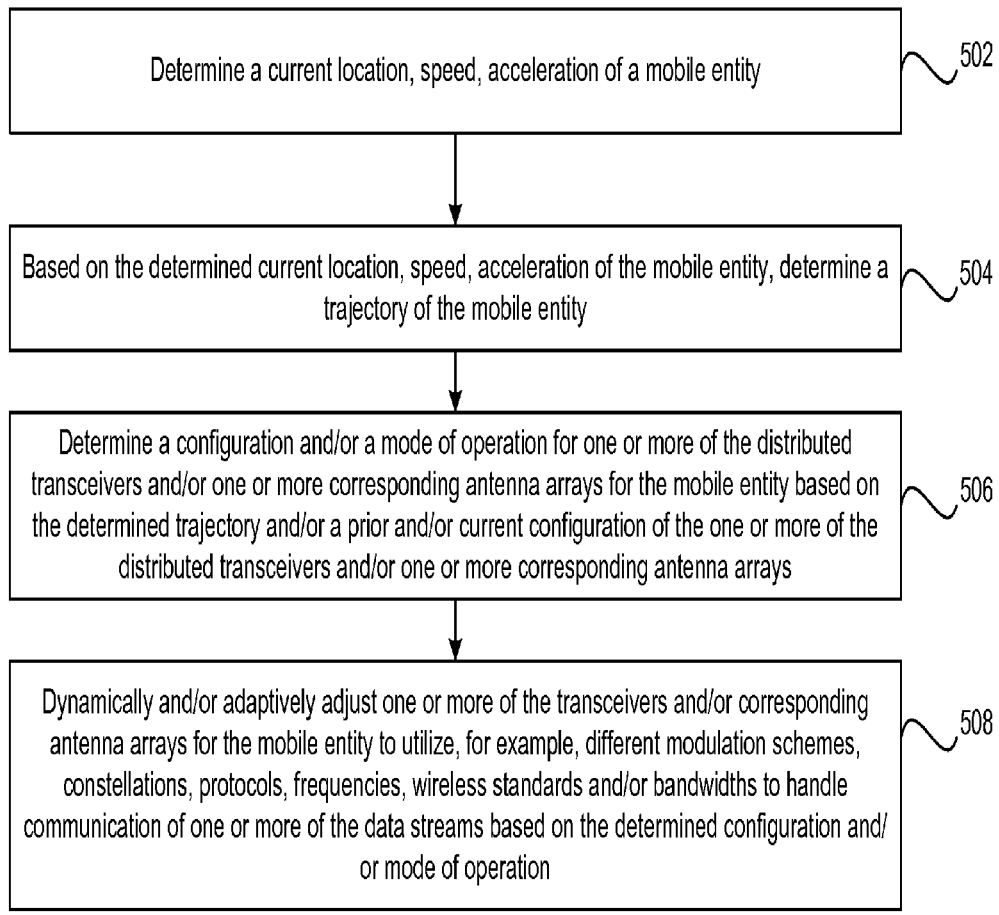
FIG. 5 is a flow chart illustrating exemplary steps for communicating utilizing distributed transceivers in a mobile entity, in accordance with an exemplary embodiment of the invention.

FIG. 5 is a flow chart illustrating exemplary steps for communicating utilizing distributed transceivers in a mobile entity, in accordance with an exemplary embodiment of the invention. Referring to FIG. 5, there are shown exemplary steps 502 through 508. In step 502, a current location, speed, acceleration of a mobile entity may be determined. In step 504, based on the determined current location, speed, acceleration of the mobile entity, a trajectory of the mobile entity may be determined or predicted. In step 506, a configuration and/or a mode of operation for one or more of the distributed transceivers and/or one or more corresponding antenna arrays for the mobile entity may be determined based on the determined trajectory and/or based on a prior and/or current configuration of the one or more of the distributed transceivers and/or one or more corresponding antenna arrays. In step 508, one or more of the transceivers and/or corresponding antenna arrays for the mobile entity may be dynamically and/or adaptively adjusted to utilize, for example, different modulation schemes, constellations, protocols, frequencies, wireless standards and/or bandwidths to handle communication of one or more of the data streams based on the determined configuration and/or mode of operation.

Figure 6:
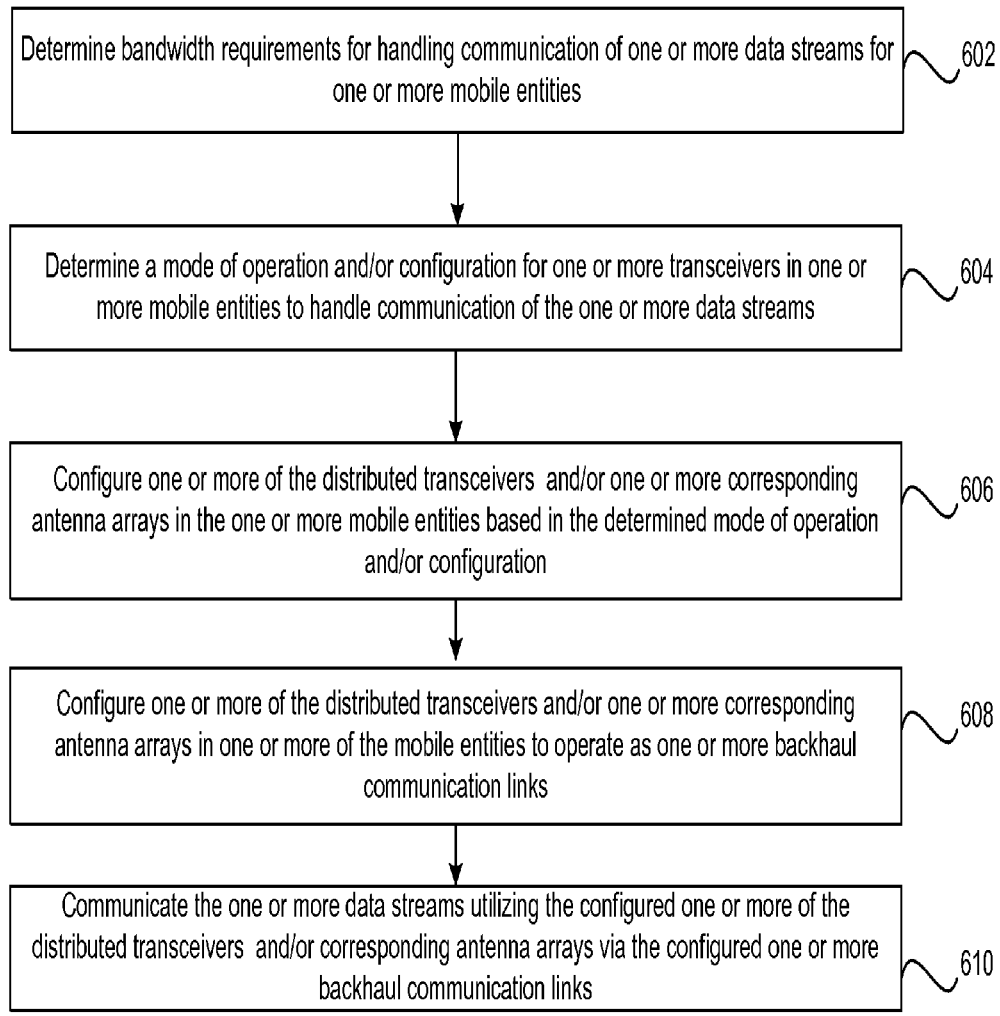
FIG. 6 is a flow chart illustrating exemplary steps for communicating utilizing distributed transceivers in a mobile entity, in accordance with an exemplary embodiment of the invention.

FIG. 6 is a flow chart illustrating exemplary steps for communicating utilizing distributed transceivers in a mobile entity, in accordance with an exemplary embodiment of the invention. Referring to FIG. 6, there are shown exemplary steps 602 through 610. In step 602, bandwidth requirements for handling communication of one or more data streams for one or more mobile entities may be determined. In step 604, a mode of operation and/or configuration for one or more transceivers in one or more mobile entities may be configured to handle communication of the one or more data streams. In step 606, one or more of the distributed transceivers and/or one or more corresponding antenna arrays in the one or more mobile entities may be configured based on the determined mode of operation and/or configuration. In step 608, one or more of the distributed transceivers and/or one or more corresponding antenna arrays in the one or more of the mobile entities may be configured to operate as one or more backhaul communication links. In step 610, the one or more data streams may be communicated utilizing the configured one or more of the distributed transceivers and/or corresponding antenna arrays via the configured one or more backhaul communication links.

In various exemplary aspects of the invention, a plurality of distributed transceivers 301a, 301b, 301c, 301d, 301e, 301f, . . . , 301n and/or one or more corresponding antenna arrays, which may be communicatively coupled to one or more of the plurality of distributed transceivers 301a, 301b, 301c, 301d, 301e, 301f, . . . , 301n, may be configured to handle communication of one or more data streams among one or more of a plurality of wireless communication networks 330, one or more other mobile entities 304, 307 and/or one or more mobile communication devices 310. The one or more data streams may be communicated utilizing the configured one or more of the plurality of distributed transceivers 301a, 301b, 301c, 301d, 301e, 301f, . . . , 301n and/or the one or more corresponding antenna arrays. The mobile entity may comprise a car, a truck, an omnibus (bus), a trailer, a mobile home, train, bus, a forklift, construction equipment, a boat, a ship, an aircraft or any other vehicle. The plurality of wireless communication networks 330 may comprise a satellite network 320, a wireless wide area network 322, a wireless medium area network, a wireless local area network 324, a wireless personal area network, Internet 326 and/or network cloud 328. Configuring of the one or more of the plurality of distributed transceivers 301a, 301b, 301c, 301d, 301e, 301f, . . . , 301n and/or the one or more corresponding antenna arrays may be controlled from a component and/or within one or more of the mobile entity 301, the one or more other mobile entities 304, 307, the one or more mobile communication devices 310 and/or one or more of the wireless communication networks 330.

In some embodiments of the invention, one or more of the plurality of distributed transceivers 301a, 301b, 301c, 301d, 301f, 301e, . . . , 301n may be configured to operate as a relay node and/or a repeater node. A location, speed and/or trajectory of the mobile entity 301 may be determined and one or more of the plurality of distributed transceivers 301a, 301b, 301c, 301d, 301e, 301f, . . . , 301n and/or one or more corresponding antenna arrays may be configured based on the determined location, speed and/or trajectory. One or more of the plurality of distributed transceivers 301a, 301b, 301c, 301d, 301e, 301f, . . . , 301n may be dynamically and/or adaptively controlled to utilize one or more modes of operation to communicate the one or more data streams and/or to split the communication of the one or more data streams amongst a portion of the plurality of distributed transceivers 301a, 301b, 301c, 301d, 301e, 301f, . . . , 301n. The modes of operation may comprise a spatial diversity mode, a frequency diversity mode, a spatial multiplexing mode, a frequency multiplexing mode and/or a MIMO mode. One or more of the plurality of distributed transceivers in a mobile entity such as the plurality of distributed transceivers 301a, 301b, 301c, 301d, 301e, 301e, . . . , 301n in the mobile entity 301 may be operable to operate in a relay and/or repeater mode.

In accordance with various embodiments of the invention, traffic may be backhauled from the mobile entity 301 and/or the one or more other mobile entities 304, 307 via one or more wireless communication links to one or more of the plurality of wireless communication networks. One or more of the plurality of distributed transceivers in the mobile entity 301 and/or the one or more other mobile entities 304, 307 may be configured to utilize different types of communication links to handle different types of data traffic. One or more of the plurality of distributed transceivers 301a, 301b, 301c, 301d, 301e, 301f, . . . , 301n in the mobile entity 301 and/or one or more of a plurality of distributed transceivers 304a, 304b, 304c, . . . , 304n, 307a, 307b, 307c, . . . , 307n in the one or more other mobile entities 304, 307, respectively, may be configured to utilize different modulation schemes, constellations, protocols, frequencies, wireless standards and/or bandwidths to handle the communication of the one or more data streams.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Other embodiments of the invention may provide a computer readable device and/or a non-transitory computer readable medium, and/or a machine readable device and/or a non-transitory machine readable medium, having stored thereon, a machine code and/or a computer program having at least one code section executable by a machine and/or a computer, thereby causing the machine and/or computer to perform the steps as described herein for distributed transceivers and mobile connectivity.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
    in a mobile entity comprising a plurality of distributed transceivers:
        determining at least one of a reflective property, a refractive property or a diffraction property of a plurality of objects associated with said plurality of distributed transceivers;
        configuring at least one of said one or more of said plurality of distributed transceivers or one or more corresponding antenna arrays that are communicatively coupled to said one or more of said plurality of distributed transceivers for communication of one or more data streams among one or more of a plurality of wireless communication networks, one or more other mobile entities and/or one or more mobile communication devices,
        wherein said at least one of said one or more of said plurality of distributed transceivers or one or more corresponding antenna arrays are configured for the communication of the of one or more data streams based on said at least one of said reflective property, said refractive property or said diffraction property of said plurality of objects associated with said plurality of distributed transceivers; and
        communicating said one or more data streams utilizing said configured at least one of one or more of said plurality of distributed transceivers or said one or more corresponding antenna arrays.

2. The method according to claim 1, wherein said mobile entity comprises at least one of a car, a truck, an omnibus (bus), a trailer, a mobile home, train, bus, a forklift, construction equipment, a boat, a ship, or an aircraft.

3. The method according to claim 1, wherein said plurality of wireless communication networks comprises at least one of a satellite network, a wireless wide area network, a wireless medium area network, a wireless local area network, a wireless personal area network or the Internet.

4. The method according to claim 1, comprising controlling said configuring of said at least one of one or more of said plurality of distributed transceivers or said one or more corresponding antenna arrays from a component within at least one of one or more of said mobile entity, said one or more other mobile entities, said one or more mobile communication devices or one or more of said wireless communication networks.

5. The method according to claim 1, comprising configuring said one or more of said plurality of distributed transceivers to operate as at least one of a relay node or a repeater node.

6. The method according to claim 1, comprising:
    determining at least one of a location, speed or trajectory of said mobile entity; and
    configuring said at least one of one or more of said plurality of distributed transceivers or one or more corresponding antenna arrays based on said determined at least one of location, speed or trajectory.

7. The method according to claim 1, comprising controlling said plurality of distributed transceivers to utilize one or more modes of operation to communicate at least one of said one or more data streams or to split said communication of said one or more data streams amongst a portion of said plurality of distributed transceivers,
    wherein said one or more modes of operation comprises at least one of a spatial diversity mode, a frequency diversity mode, a spatial multiplexing mode, a frequency multiplexing mode or a MIMO mode.

8. The method according to claim 1, comprising backhauling traffic from at least one of said mobile entity or said one or more other mobile entities via one or more wireless communication links to said one or more of said plurality of wireless communication networks.

9. The method according to claim 1, comprising configuring one or more of said plurality of distributed transceivers in at least one of said mobile entity or said one or more other mobile entities to utilize different types of communication links for different types of data traffic.

10. The method according to claim 1, comprising configuring one or more of said plurality of distributed transceivers in at least one of said mobile entity or said one or more other mobile entities to utilize at least one of different modulation schemes, constellations, protocols, frequencies, wireless standards or bandwidths for said communication of said one or more data streams.

11. A system, comprising:
a plurality of distributed transceivers in a mobile entity, wherein:
at least one of one or more of said plurality of distributed transceivers or one or more corresponding antenna arrays that are communicatively coupled to said one or more of said plurality of distributed transceivers are configured to:
determine at least one of a reflective property, a refractive property or a diffraction property of a plurality of objects associated with said plurality of distributed transceivers;
configure at least one of said one or more of said plurality of distributed transceivers or one or more corresponding antenna arrays that are communicatively coupled to said one or more of said plurality of distributed transceivers for communication of one or more data streams among one or more of a plurality of wireless communication networks, one or more other mobile entities and/or one or more mobile communication devices,
wherein said at least one of said one or more of said plurality of distributed transceivers or one or more corresponding antenna arrays are configured for the communication of the one or more data streams based on said at least one of said reflective property, said refractive property or said diffraction property of said plurality of objects associated with said plurality of distributed transceivers; and
said one or more data streams are communicated utilizing said configured at least one of one or more of said plurality of distributed transceivers or said one or more corresponding antenna arrays.

12. The system according to claim 11, wherein said mobile entity comprises at least one of a car, a truck, an omnibus (bus), a trailer, a mobile home, train, bus, a forklift, construction equipment, a boat, a ship, or an aircraft.

13. The system according to claim 11, wherein said plurality of wireless communication networks comprises at least one of a satellite network, a wireless wide area network, a wireless medium area network, a wireless local area network, a wireless personal area network or the Internet.

14. The system according to claim 11, wherein said configuration of said at least one of one or more of said plurality of distributed transceivers or said one or more corresponding antenna arrays is controlled from a component within at least one of one or more of said mobile entity, said one or more other mobile entities, said one or more mobile communication devices or one or more of said wireless communication networks.

15. The system according to claim 11, wherein said one or more of said plurality of distributed transceivers is further configured to operate at least one of as a relay node or a repeater node.

16. The system according to claim 11, wherein said one or more of said plurality of distributed transceivers is further configured to:
determine at least one of a location, speed or trajectory of said mobile entity; and
configure said at least one of one or more of said plurality of distributed transceivers or one or more corresponding antenna arrays is configured based on said determined at least one of location, speed or trajectory.

17. The system according to claim 11, wherein said plurality of distributed transceivers are controlled to utilize one or more modes of operation to communicate at least one of said one or more data streams or to split said communication of said one or more data streams amongst a portion of said plurality of distributed transceivers,
wherein said one or more modes of operation comprises at least one of a spatial diversity mode, a frequency diversity mode, a spatial multiplexing mode, a frequency multiplexing mode or a MIMO mode.

18. The system according to claim 11, wherein traffic from at least one of said mobile entity or said one or more other mobile entities are backhauled via one or more wireless communication links to said one or more of said plurality of wireless communication networks.

19. The system according to claim 11, wherein one or more of said plurality of distributed transceivers in at least one of said mobile entity or said one or more other mobile entities is configured to utilize different types of communication links for different types of data traffic.

20. The system according to claim 11, wherein one or more of said plurality of distributed transceivers in at least one of said mobile entity or said one or more other mobile entities is configured to utilize at least one of different modulation schemes, constellations, protocols, frequencies, wireless standards or bandwidths for said communication of said one or more data streams.

* * * * *